United States Patent
Tagome et al.

(10) Patent No.: US 8,363,440 B2
(45) Date of Patent: Jan. 29, 2013

(54) POWER CONVERSION CIRCUIT HAVING OFF-VOLTAGE CONTROL CIRCUIT

(75) Inventors: Masaki Tagome, Osaka (JP); Makoto Kitabatake, Nara (JP); Shun Kazama, Osaka (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 12/864,856

(22) PCT Filed: Dec. 16, 2009

(86) PCT No.: PCT/JP2009/006930
§ 371 (c)(1),
(2), (4) Date: Jul. 27, 2010

(87) PCT Pub. No.: WO2010/070899
PCT Pub. Date: Jun. 24, 2010

(65) Prior Publication Data
US 2010/0301784 A1 Dec. 2, 2010

(30) Foreign Application Priority Data
Dec. 17, 2008 (JP) ................................. 2008-320956

(51) Int. Cl.
*H02M 7/537* (2006.01)
*H02P 1/00* (2006.01)
(52) U.S. Cl. ........................................ 363/131; 318/139
(58) Field of Classification Search ................ 363/131, 363/132
See application file for complete search history.

(56) References Cited

U.S. PATENT DOCUMENTS

| 6,747,884 B2 * | 6/2004 | Nishizawa et al. ........... 363/132 |
| 7,733,616 B2 * | 6/2010 | Yamada ......................... 361/31 |
| 7,750,595 B2 * | 7/2010 | Yamada et al. ............... 318/801 |
| 7,839,113 B2 * | 11/2010 | Maeda et al. ................. 318/721 |
| 2006/0066270 A1 * | 3/2006 | Kumagai et al. ............. 318/139 |

FOREIGN PATENT DOCUMENTS

| JP | 04-079760 | 3/1992 |
| JP | 04-091660 | 3/1992 |
| JP | 2004-159424 | 6/2004 |

* cited by examiner

*Primary Examiner* — Adolf Berhane
*Assistant Examiner* — Emily Pham
(74) *Attorney, Agent, or Firm* — McDermott Will & Emery LLP

(57) ABSTRACT

In a power conversion circuit operating with high frequency, an off-voltage control circuit $101u$ of a lower-arm gate drive circuit $24u$ controls the output voltage of a gate drive power supply $103u$ to change the output voltage to a voltage lower than a predetermined off voltage during a time period from termination of turn-off operation of a lower arm $22u$ until start of turn-on operation of an upper arm $21u$, and thereafter return the output voltage to the predetermined off voltage immediately after termination of the turn-on operation of the upper arm $21u$. With this control, short-circuiting through the upper and lower arms occurring due to a high voltage change dv/dt can be avoided, and the life of a switching element constituting the power conversion circuit improves, increasing the reliability of the power conversion circuit.

30 Claims, 15 Drawing Sheets

POWER CONVERSION CIRCUIT HAVING OFF-VOLTAGE CONTROL CIRCUIT

RELATED APPLICATIONS

This application is the U.S. National Phase under 35 U.S.C. §371 of International Application No. PCT/JP2009/006930, filed on Dec. 16, 2009, which in turn claims the benefit of Japanese Application No. 2008-320956, filed on Dec. 17, 2008, the disclosures of which Applications are incorporated by reference herein.

TECHNICAL FIELD

The present disclosure relates to a power conversion circuit that is constructed of a plurality of upper and lower arms and, in particular, operates with large power and high frequency.

BACKGROUND ART

In recent years, switching elements (IGBTs, MOSFETs, and JFETs) included in power conversion devices such as inverters and converters have become increasingly high in voltage resistance and speed. In this situation, research and development has been actively conducted on power conversion devices, for increasing the power of power conversion devices using switching elements with high voltage resistance, and for reducing the size of power conversion devices by achieving high-frequency operation thereof using switching elements with high speed.

In operation of switching elements of such a power conversion device, a pair of upper or lower arms are normally switched alternately with a predetermined break period (generally referred to as a dead time) therebetween to avoid simultaneous on conduction of the upper and lower arms causing short-circuiting. The higher the voltage applied to a switching element, or the higher the operation speed of a switching element, the larger the change rate of the voltage applied to the switching element (normally expressed by dv/dt) is. When the change rate is large, a charge current will flow from a main terminal to a control terminal via a parasitic capacitance C in the other switching element of the pair, changing the voltage of the control terminal in proportion to the value of the charge current. When such operation occurs, the voltage of the control terminal may possibly exceed the threshold voltage of the switching element. If the voltage of the control terminal changes and exceeds the threshold voltage during a predetermined break period, the upper and lower arms will conduct simultaneously causing short-circuiting, resulting in breaking of the switching element, and moreover failure of the power conversion device.

Referring to FIG. 4, a mechanism of malfunction of a lower arm 22*u* due to turn-on operation of an upper arm 21*u* will be described. Assume that the upper and lower arms 21*u* and 22*u* are in a break period during which they are both off (dead time). The break period is equal to or less than 1/20 of the switching frequency of an inverter, for example. In general, the switching frequency is 15 kHz or less for an inverter adapted to conversion of large power.

After the break period, when the upper arm 21*u* turns on, a DC voltage Vdc of a battery 1 is applied between the drain and source of the lower arm 22*u*. A parasitic capacitance 200 of the lower arm 22*u* is rapidly charged according to the switching speed of the upper arm 21*u*, causing flow of a current Ig via a lower-arm gate resistance 104*u* and a lower-arm arm-drive circuit 102*u*. With this flow of the current Ig, a potential difference corresponding to the value of the lower-arm gate resistance 104*u* occurs at both ends of the lower-arm gate resistance 104*u*. The potential difference occurring at both ends of the lower-arm gate resistance 104*u*, i.e., the gate-source potential difference Vgs of the lower arm 22*u* is expressed by $$Vgs = Rg \times Cgd \times (dVdc/dt)$$

where Cgd is the drain-gate parasitic capacitance of the lower arm 22*u* and Rg is the resistance of the lower-arm gate resistance 104*u*.

That is, as the resistance Rg of the lower-arm gate resistance 104*u* that determines the switching speed of the lower arm 22*u*, the parasitic capacitance Cgd of the lower arm 21*u*, and the value of the switching time dVdc/dt of the upper arm 21*u* are larger, Vgs becomes larger, and the lower arm 22*u* is more likely to cause malfunction.

The resistance Rg of the lower-arm gate resistance 104*u* cannot be reduced arbitrarily because it is a value determining the switching speed of the lower arm 22*u*. The parasitic capacitance Cgd of the lower arm 21*u* cannot be changed arbitrarily, either, because it is determined by the internal structure of the lower arm 22*u*. If the switching time dVdc/dt of the upper arm 21*u* during its turn-on operation is reduced, the switching speed of the upper arm 21*u* will be reduced, resulting in increase in switching loss.

To avoid the above problems, conventionally, a negative bias voltage is applied to the control terminal of a switching element over the time period when the switching element is off, including a voltage change time when the voltage at the control terminal changes due to a charge current, if any, so that no short-circuited state occurs. With this application of a negative voltage, short-circuiting due to simultaneous conduction can be avoided. This technique is suggested in Patent Document 1, for example.

Patent Document 1 also discloses that, in the disclosed inverter, to turn off a switching element, a negative bias voltage is not output from a power supply, but can be applied with only circuits such as a capacitor and a diode, a FET, and the like. Therefore, constraints of the power supply voltage can be reduced, and moreover, heat dissipation of a drive circuit can be avoided.

CITATION LIST

Patent Document

PATENT DOCUMENT 1: Japanese Patent Publication No. P2004-159424

SUMMARY OF THE INVENTION

Technical Problem

However, in the inverter of the type described above, a negative bias will be applied to the control terminal of the switching element over the entire time period when the switching element is off In general, a switching element is vulnerable to application of a negative bias voltage to its control terminal. The longer the duration of application of a negative bias voltage, the more the switching element will deteriorate.

Therefore, in the conventional method, in which the duration of application of a negative bias voltage is longer than necessary, deterioration of the switching element will be accelerated, impairing the reliability of the switching element and also a power conversion device including the switching element. In addition, being constructed of a capacitor and a diode, a FET, and the like, the negative bias circuit cannot respond to a change in the characteristics of the switching element due to the operation state of the switching element, the surrounding environment, and the like. Moreover, the capacitance of the capacitor constituting the negative bias circuit must be determined according to the characteristics of the switching element driven. This lacks versatility.

In view of the problems described above, it is an object of the present invention to provide a power conversion circuit in which malfunction due to high dv/dt application is avoided and the life of switching elements can be greatly improved.

Solution to the Problem

To attain the object described above, in a power conversion circuit according to the present invention, the duration of application of a negative bias voltage to a switching element that is off is limited to an extremely short time for both the operation of an upper arm and the operation of a lower arm.

The power conversion circuit of the present invention includes: an upper arm connected to a high-voltage side; a lower arm connected to a low-voltage side; an upper-arm gate drive circuit configured to drive the upper arm, and a lower-arm gate drive circuit configured to drive the lower arm, herein the upper-arm gate drive circuit includes an upper-arm gate drive power supply and an upper-arm arm-drive circuit, and the lower-arm gate drive circuit includes a lower-arm gate drive power supply and a lower-arm arm-drive circuit, the upper-arm gate drive power supply and the lower-arm gate drive power supply supply a voltage to a control terminal of the corresponding upper or lower arm, the upper-arm arm-drive circuit and the lower-arm arm-drive circuit, receiving a control signal for controlling the corresponding upper or lower arm, output an arm drive signal according to the control signal, the lower-arm gate drive circuit further includes a signal output circuit and an off-voltage control circuit, the signal output circuit outputs a voltage adjustment signal responding to termination of turn-off operation of the lower arm and termination of turn-on operation of the upper arm, the off-voltage control circuit controls the output voltage of the lower-arm gate drive power supply, in response to the voltage adjustment signal from the signal output circuit, to generate a second voltage lower than a first voltage satisfying an off state of the lower arm during a time period from termination of turn-off operation of the lower arm until start of turn-on operation of the upper arm, and to generate the first voltage instead of the second voltage at and after termination of the turn-on operation of the upper arm.

In the power conversion circuit described above, the signal output circuit may include a timer circuit, the timer circuit, receiving the control signals for the upper arm and the lower arm, may output a timer signal that turns on in a time period when the control signals are both off and thus the lower arm and the upper arm are both in their off states, and turns off after a lapse of a predetermined time from the turn-on, which is at or after termination of turn-on operation of the upper arm, and the off-voltage control circuit, receiving the timer signal from the timer circuit, may control the output voltage of the lower-arm gate drive power supply based on the timer signal.

In the power conversion circuit described above, the signal output circuit may include an upper-arm main terminal voltage detection circuit, a lower-arm main terminal voltage detection circuit, an upper-arm determination circuit, and a lower-arm determination circuit, the upper-arm main terminal voltage detection circuit and the lower-arm main terminal voltage detection circuit may detect a main terminal voltage value of the corresponding upper or lower arm, and the upper-arm determination circuit and the lower-arm determination circuit, receiving the main terminal voltage signal detected by the corresponding upper-arm or lower-arm main terminal voltage detection circuit, may detect termination of turn-off operation and turn-on operation of the corresponding upper or lower arm based on the main terminal voltage signal.

In the power conversion circuit described above, the upper-arm determination circuit and the lower-arm determination circuit, receiving the main terminal voltage signal detected by the corresponding upper-arm or lower-arm main terminal voltage detection circuit, may determine termination of turn-on operation and turn-off operation of the corresponding arm based on comparison of the voltage value of the main terminal voltage signal with a predetermined reference voltage.

In the power conversion circuit described above, the signal output circuit may include an upper-arm main terminal current detection circuit, a lower-arm main terminal current detection circuit, an upper-arm determination circuit, and a lower-arm determination circuit, the upper-arm main terminal current detection circuit and the lower-arm main terminal current detection circuit may detect a main terminal current value of the corresponding upper or lower arm, and the upper-arm determination circuit and the lower-arm determination circuit may detect termination of turn-off operation and turn-on operation of the corresponding upper or lower arm based on the main terminal current signal detected by the corresponding upper-arm or lower-arm main terminal current detection circuit.

In the power conversion circuit described above, the upper-arm determination circuit and the lower-arm determination circuit, receiving the main terminal current signal from the corresponding upper-arm or lower-arm main terminal current detection circuit, may determine termination of turn-on operation and turn-off operation of the corresponding arm based on comparison of the current value of the main terminal current signal with a predetermined reference current.

In the power conversion circuit described above, the signal output circuit may include an upper-arm control terminal voltage detection circuit, a lower-arm control terminal voltage detection circuit, an upper-arm determination circuit, and a lower-arm determination circuit, the upper-arm control terminal voltage detection circuit and the lower-arm control terminal voltage detection circuit may detect a control terminal voltage value of the corresponding upper or lower arm, and the upper-arm determination circuit and the lower-arm determination circuit may detect termination of turn-off operation and turn-on operation of the corresponding upper or lower arm based on the control terminal voltage signal detected by the corresponding upper-arm or lower-arm control terminal voltage detection circuit.

In the power conversion circuit described above, the upper-arm determination circuit and the lower-arm determination circuit, receiving the control terminal voltage signal detected by the control terminal voltage detection circuit of the corresponding arm, may determine termination of turn-on operation and turn-off operation of the corresponding arm based on comparison of the voltage of the control terminal voltage signal with a predetermined reference voltage.

In the power conversion circuit described above, the signal output circuit may further include a lower-arm main terminal voltage change rate detection circuit, the lower-arm main terminal voltage change rate detection circuit may detect a change rate of the main terminal voltage of the corresponding lower arm, and the off-voltage control circuit, receiving the detection result of the lower-arm main terminal voltage change rate detection circuit, may change the voltage value of the second voltage generated by the lower-arm gate drive power supply based on the detection result.

In the power conversion circuit described above, the off-voltage control circuit may adjust the voltage value of the second voltage generated by the lower-arm gate drive power supply to be lower as the change rate of the main terminal voltage of the lower arm is larger.

In the power conversion circuit described above, the off-voltage control circuit may keep the voltage value of the second voltage generated by the lower-arm gate drive power supply at the first voltage when the change rate of the main terminal voltage of the lower arm is smaller than a predetermined change rate.

In the power conversion circuit described above, the signal output circuit may further include a lower-arm arm-temperature detection circuit, the lower-arm arm-temperature detection circuit may detect the temperature of the corresponding lower arm, and the off-voltage control circuit, receiving the detection result of the lower-arm arm-temperature detection circuit, may change the voltage value of the second voltage generated by the lower-arm gate drive power supply based on the detection result.

In the power conversion circuit described above, the off-voltage control circuit may adjust the voltage value of the second voltage generated by the lower-arm gate drive power supply to be lower as the temperature of the lower arm detected by the lower-arm arm-temperature detection circuit is higher.

Alternatively, the power conversion circuit of the present invention includes: an upper arm connected to a high-voltage side; a lower arm connected to a low-voltage side; an upper-arm gate drive circuit configured to drive the upper arm, and a lower-arm gate drive circuit configured to drive the lower arm, wherein the upper-arm gate drive circuit includes an upper-arm gate drive power supply and an upper-arm arm-drive circuit, and the lower-arm gate drive circuit includes a lower-arm gate drive power supply and a lower-arm arm-drive circuit, the upper-arm gate drive power supply and the lower-arm gate drive power supply supply a voltage to a control terminal of the corresponding upper or lower arm, the upper-arm arm-drive circuit and the lower-arm arm-drive circuit, receiving a control signal for controlling the corresponding upper or lower arm, output an arm drive signal according to the control signal, the upper-arm gate drive circuit further includes a signal output circuit and an off-voltage control circuit, the signal output circuit outputs a voltage adjustment signal corresponding to termination of turn-off operation of the upper arm and termination of turn-on operation of the lower arm, the off-voltage control circuit controls the output voltage of the upper-arm gate drive power supply, in response to the voltage adjustment signal from the signal output circuit, to generate a second voltage lower than a first voltage satisfying an off state of the upper arm during a time period from termination of turn-off operation of the upper arm until start of turn-on operation of the lower arm, and to generate the first voltage instead of the second voltage at and after termination of the turn-on operation of the lower arm.

In the power conversion circuit described above, the signal output circuit may include a timer circuit, the timer circuit, receiving the control signals for the upper arm and the lower arm, may output a timer signal that turns on in a time period when the control signals are both off and thus the lower arm and the upper arm are both in their off states, and turn off after a lapse of a predetermined time of the turn-on, which is at or after termination of turn-on operation of the lower arm, and the off-voltage control circuit, receiving the timer signal from the timer circuit, may control the output voltage of the lower-arm gate drive power supply based on the timer signal.

In the power conversion circuit described above, the signal output circuit may include an upper-arm main terminal voltage detection circuit, a lower-arm main terminal voltage detection circuit, an upper-arm determination circuit, and a lower-arm determination circuit, the upper-arm main terminal voltage detection circuit and the lower-arm main terminal voltage detection circuit may detect a main terminal voltage value of the corresponding upper or lower arm, and the upper-arm determination circuit and the lower-arm determination circuit, receiving the main terminal voltage signal detected by the corresponding upper-arm or lower-arm main terminal voltage detection circuit, may detect termination of turn-off operation and turn-on operation of the corresponding upper or lower arm based on the main terminal voltage signal.

In the power conversion circuit described above, the upper-arm determination circuit and the lower-arm determination circuit, receiving the main terminal voltage signal detected by the corresponding upper-arm or lower-arm main terminal voltage detection circuit, may determine termination of turn-on operation and turn-off operation of the corresponding arm based on comparison of the voltage value of the main terminal voltage signal with a predetermined reference voltage.

In the power conversion circuit described above, the signal output circuit may include an upper-arm main terminal current detection circuit, a lower-arm main terminal current detection circuit, an upper-arm determination circuit, and a lower-arm determination circuit, the upper-arm main terminal current detection circuit and the lower-arm main terminal current detection circuit may detect a main terminal current value of the corresponding upper or lower arm, and the upper-arm determination circuit and the lower-arm determination circuit may detect termination of turn-off operation and turn-on operation of the corresponding upper or lower arm based on the main terminal current signal detected by the corresponding upper-arm or lower-arm main terminal current detection circuit.

In the power conversion circuit described above, the upper-arm determination circuit and the lower-arm determination circuit, receiving the main terminal current signal from the corresponding upper-arm or lower-arm main terminal current detection circuit, may determine termination of turn-on operation and turn-off operation of the corresponding arm based on comparison of the current value of the main terminal current signal with a predetermined reference current.

In the power conversion circuit described above, the signal output circuit may include an upper-arm control terminal voltage detection circuit, a lower-arm control terminal voltage detection circuit, an upper-arm determination circuit, and a lower-arm determination circuit, the upper-arm control terminal voltage detection circuit and the lower-arm control terminal voltage detection circuit may detect a control terminal voltage value of the corresponding upper or lower arm, and the upper-arm determination circuit and the lower-arm determination circuit may detect termination of turn-off operation and turn-on operation of the corresponding upper or lower arm based on the control terminal voltage signal detected by the corresponding upper-arm or lower-arm control terminal voltage detection circuit.

In the power conversion circuit described above, the upper-arm determination circuit and the lower-arm determination circuit, receiving the control terminal voltage signal detected by the control terminal voltage detection circuit of the corresponding arm, may determine termination of turn-on operation and turn-off operation of the corresponding arm based on comparison of the voltage of the control terminal voltage signal with a predetermined reference voltage.

In the power conversion circuit of described above, the signal output circuit may further include an upper-arm main terminal voltage change rate detection circuit, the upper-arm main terminal voltage change rate detection circuit may detect a change rate of the main terminal voltage of the corresponding upper arm, and the off-voltage control circuit, receiving the detection result of the upper-arm main terminal voltage change rate detection circuit, may change the voltage value of the second voltage generated by the upper-arm gate drive power supply based on the detection result.

In the power conversion circuit described above, the off-voltage control circuit may adjust the voltage value of the second voltage generated by the upper-arm gate drive power supply to be lower as the change rate of the main terminal voltage of the upper arm is larger.

In the power conversion circuit described above, the off-voltage control circuit may keep the voltage value of the second voltage generated by the upper-arm gate drive power supply at the first voltage when the change rate of the main terminal voltage of the upper arm is smaller than a predetermined change rate.

In the power conversion circuit described above, the signal output circuit may further include an upper-arm arm-temperature detection circuit, the upper-arm arm-temperature detection circuit may detect the temperature of the corresponding upper arm, and the off-voltage control circuit, receiving the detection result of the upper-arm arm-temperature detection circuit, may change the voltage value of the second voltage generated by the upper-arm gate drive power supply based on the detection result.

In the power conversion circuit described above, the off-voltage control circuit may adjust the second voltage generated by the upper-arm gate drive power supply to be lower as the temperature of the upper arm detected by the upper-arm arm-temperature detection circuit is higher.

In the power conversion circuit described above, each of the upper arm and the lower arm may be constructed of a MOSFET.

In the power conversion circuit described above, each of the upper arm and the lower arm may be constructed of a wide bandgap semiconductor including silicon carbide or gallium nitride.

As described above, according to the present invention, an arm drive signal having a voltage lower than a predetermined off voltage is output during the time period from termination of turn-off operation of the corresponding arm until start of turn-on operation of the other arm. Thereafter, immediately after termination of the turn-on operation of the other arm, the voltage of the arm drive signal is returned to the predetermined off voltage. Therefore, it is possible to greatly shorten the duration of application of a voltage lower than the predetermined off voltage that is applied to the control terminal to turn off the arm made of a switching element, and thus avoid malfunction due to application of high dv/dt. As a result, a power conversion circuit with high reliability can be presented, in which short-circuiting through the upper and lower arms can be avoided, and the life of the switching element is greatly improved.

In particular, the time points of termination of turn-off operation of the corresponding arm and turn-on operation of the other arm are grasped by detecting the main terminal voltages, the main terminal currents, or the control terminal voltages of the arms directly. Therefore, with correct detection of the time points of termination of turn-off operation of the corresponding arm and turn-on operation of the other arm, it is possible to minimize the duration of application of a voltage lower than the predetermined off voltage applied to the control terminal of the switching element of the arm, and thus avoid malfunction due to application of high dv/dt effectively.

As the change rate of the main terminal voltage of the other arm that is on is larger, the corresponding arm that is off is more likely to turn on, increasing the possibility of short-circuiting through the upper and lower arms. However, since the off voltage to be applied to the control terminal of the corresponding arm is changed to a voltage lower than the predetermined off voltage, unnecessary turn-on of the corresponding arm is less likely to occur. Therefore, while the load on the control terminal of the switching element is minimized by setting the off voltage according to the change rate of the main terminal voltage, malfunction due to application of high dv/dt can be avoided.

In the above case, when the change rate of the main terminal voltage is smaller than a predetermined change rate, in particular, the off voltage to be applied to the control terminal of the corresponding arm is kept at the predetermined off voltage. Therefore, while the load on the control terminal of the switching element is avoided, malfunction due to application of high dv/dt can be avoided.

When the arm temperature becomes high, the threshold voltage of the arm (reference voltage with which the arm is turned on) becomes low, and thus the arm that is off becomes easy to turn on with a comparatively low off voltage. However, since the off voltage applied to the control terminal of the arm that is off is further reduced, such unnecessary turn-on operation is less likely to occur. Accordingly, malfunction due to application of high dv/dt can be stably avoided.

ADVANTAGES OF THE INVENTION

As described above, according to the power conversion circuit of the present invention, when a voltage lower than a predetermined off voltage is applied to the control terminal of a switching element as an arm, the duration of the application is greatly shortened, and yet malfunction due to application of high dv/dt can be avoided. Therefore, it is possible to present a power conversion circuit with high reliability in which short-circuiting through upper and lower arms is avoided and the life of the switching element is greatly improved.

DESCRIPTION OF EMBODIMENTS

Preferred embodiments of a gate drive circuit as the power conversion circuit of the present invention will be described hereinafter.

(First Embodiment)

Figure 1:
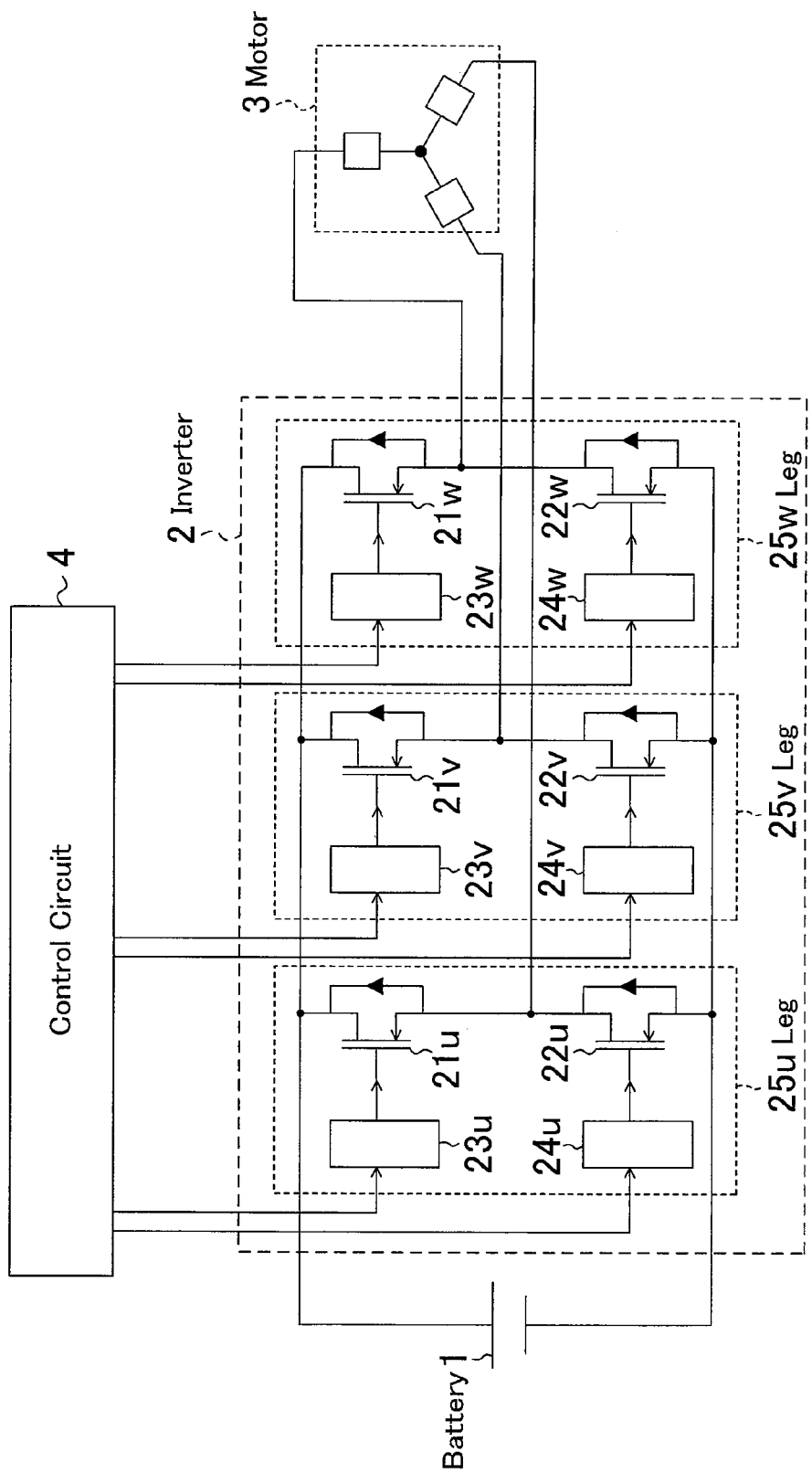
FIG. 1 is a circuit diagram showing the entire schematic configuration of a motor drive system, presented to illustrate a power conversion circuit of a first embodiment of the present invention.

FIG. 1 is a schematic circuit diagram of a motor drive system, presented to illustrate an inverter of a first embodiment to which the present invention is applied. Herein, as an example, MOSFETs are used as switching elements. The motor drive system is constructed of a battery 1, an inverter 2, a motor 3, and a control circuit 4.

The battery 1 supplies DC power to the inverter 2. The inverter 2 converts the DC power supplied from the battery 1 to AC power and supplies the AC power to the motor 3. The motor 3 revolves with the AC power supplied from the inverter 2. The control circuit 4 controls the inverter 2 so that the motor 3 operates as desired. The inverter 2 is constructed of the same number of legs (25u, 25v, 25w) as the number of kinds of AC power to be output. The legs 25u, 25v, and 25w respectively include: upper arms 21u, 21v, and 21w (positive side) and lower arms 22u, 22v, and 22w (negative side) connected in series between the positive and negative terminals of the battery 1; and upper-arm gate drive circuits 23u, 23v, and 23w and lower-arm gate drive circuits 24u, 24v, and 24w respectively corresponding to the upper arms 21u, 21v, and 21w and the lower arms 22u, 22v, and 22w.

Figure 2:
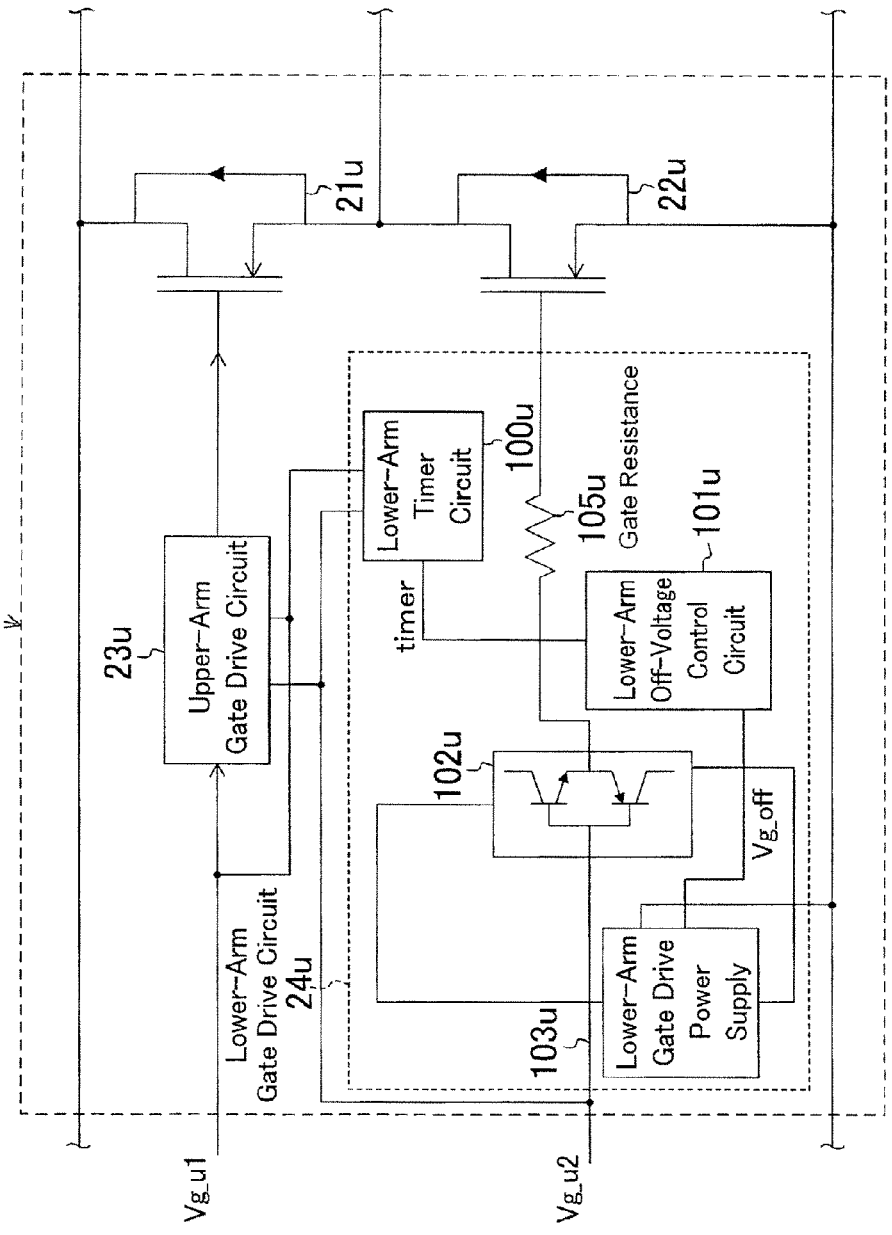
FIG. 2 is a circuit diagram showing the internal configuration of a leg of an inverter of the power conversion circuit.

FIG. 2 is a circuit diagram presented to illustrate the leg 25u in FIG. 1 in detail. The lower-arm gate drive circuit 24u includes a lower-arm timer circuit 100u as a signal output circuit, a lower-arm off-voltage control circuit 101u, a lower-arm arm-drive circuit 102u, a lower-arm gate drive power supply 103u, and a lower-arm gate resistance 105u.

The lower-arm gate drive power supply 103u outputs an on voltage of about 10 to 30 V that is based on the source potential of the lower arm 22u to be driven by the lower-arm gate drive circuit 24u, and also outputs an off voltage of about 0 to −30 V that is also based on the source potential of the lower arm 22u. The off voltage is determined from the threshold voltage for controlling on/off of the switching element and the characteristics of the switching element. In general, for a switching element having a threshold voltage of about 3 V, the off voltage is set to about 0 to −15 V. The higher the voltage applied to the control terminal of the switching element, the lower the reliability of the switching element becomes. In general, therefore, the maximum rated voltage is set to about ±30 V.

Control signals Vg_u1 and Vg_u2 are supplied to the upper-arm gate drive circuit 23u and the lower-arm gate drive circuit 24u. The control signals Vg_u1 and Vg_u2, which are output from the control circuit 4 (not shown in FIG. 2), are signals for controlling the switching operation of the upper arm 21u and the lower arm 22u.

The lower-arm gate drive power supply 103u receives the control signal Vg_u2, and then outputs a signal corresponding to the control signal Vg_u2 to the lower-arm arm-drive circuit 102u. The lower-arm gate drive power supply 103u also supplies power to the lower-arm arm-drive circuit 102u. The lower-arm arm-drive circuit 102u performs power amplification for the input signal and outputs the resultant signal to the control terminal of the lower arm 22u via the lower-arm gate resistance 104u.

Next, the operation of the lower-arm timer circuit (signal output circuit) 100u and the lower-arm off-voltage control circuit 101u will be described. The control signals Vg_u1 and Vg_u2 output from the control circuit 4 (not shown in FIG. 2) are input into the lower-arm timer circuit 100u. The lower-arm timer circuit 100u outputs a timer signal (voltage adjustment signal) determined from on/off of the control signals Vg_u1 and Vg_u2 to the lower-arm off-voltage control circuit 101u.

The lower-arm off-voltage control circuit 101u outputs a Vg_off signal determined from on/off of the timer signal to the lower-arm gate drive power supply 103u. The lower-arm gate drive power supply 103u changes the output off voltage arbitrarily according to the Vg_off signal.

All of the upper-arm gate drive circuits 23u, 23v, and 23w and the lower-arm gate drive circuits 24u, 24v, and 24w may have the same circuit configuration.

Figure 3:
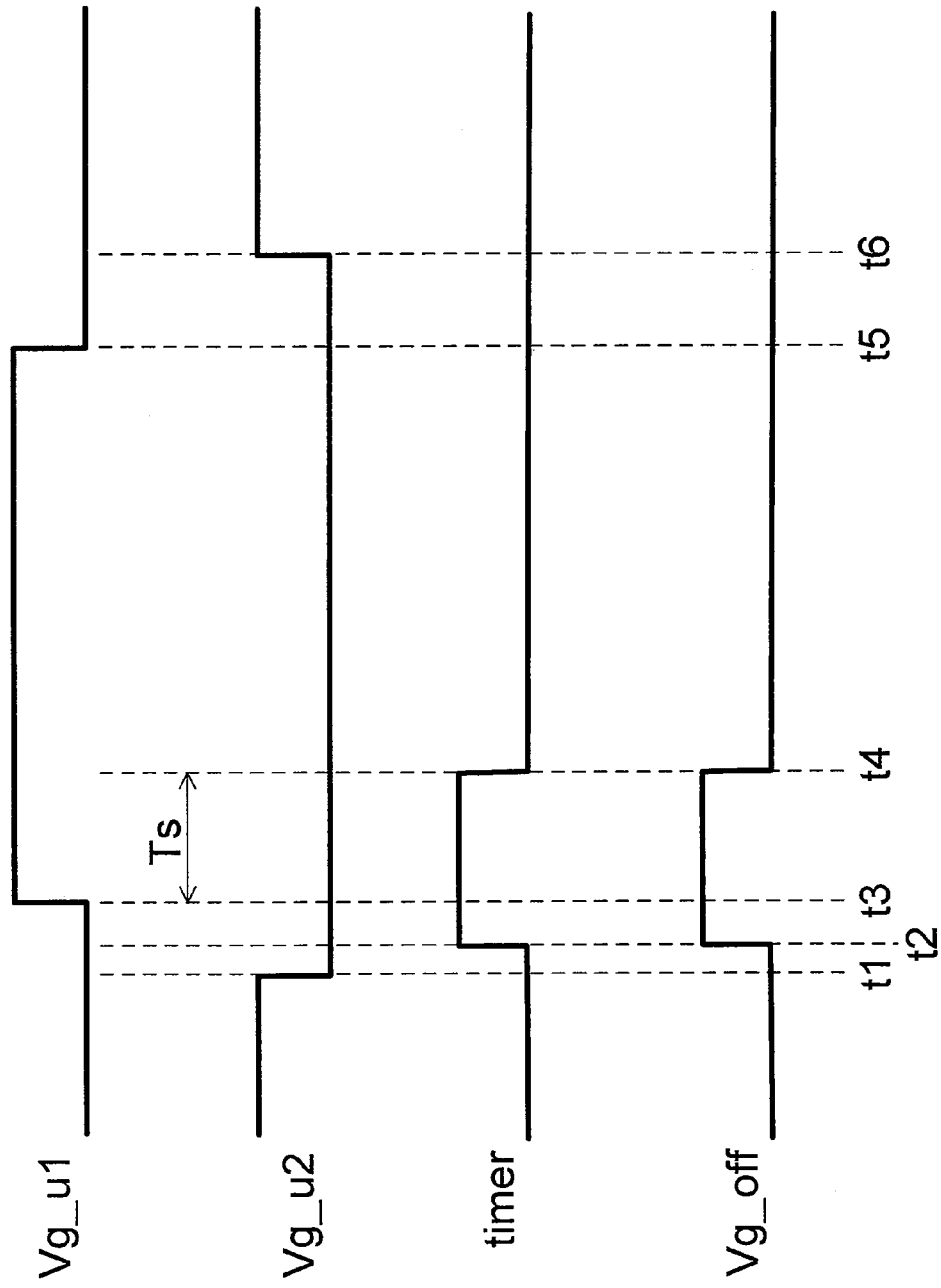
FIG. 3 is a timing chart of operation of a lower-arm gate drive circuit of the leg.
Figure 4:
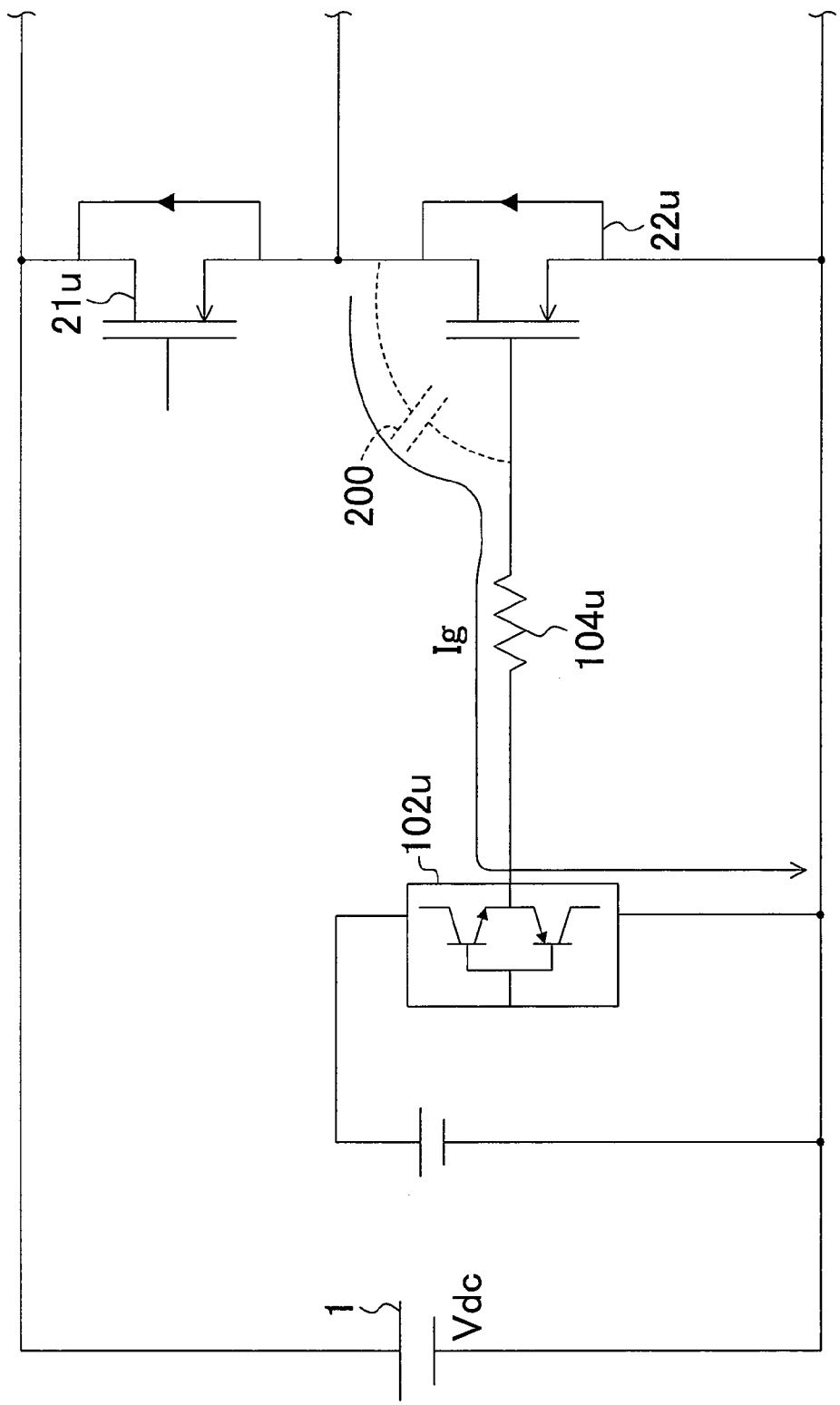
FIG. 4 is a view illustrating a mechanism of malfunction of a lower arm due to turn-on operation of an upper arm.

Next, the circuit operation of the lower-arm gate drive circuit 24u will be described. FIG. 3 is a timing chart illustrating the operation of the lower-arm gate drive circuit 24u.

In FIG. 3, Vg_u1 and Vg_u2 are control signals output from the control circuit 4 to the upper-arm gate drive circuit 23u and the lower-arm gate drive circuit 24u. The timer signal (voltage adjustment signal) rises at a time somewhere between a fall time t1 of the control signal Vg_u2 and a rise time t3 of the control signal Vg_u1, and thereafter falls at a time point when a given time (timer time) Ts has passed from the rise time t3 of the control signal Vg_u1. The given time Ts is set in advance to be a time period from rising of the control signal Vg_u1 until the turn-on operation termination time at which the upper arm 21u has actually completed its turn-on operation, or until a little after the turn-on operation termination time. The signal Vg_off operates approximately in synchronization with the timer signal. Having the circuit operating in this way, it is possible to avoid malfunction of the lower arm 22u caused by rapid charge of the parasitic capacitance of the lower arm 22u during turn-on operation of the upper arm 21u, which mainly occur in high-speed switching operation.

It is desirable that the given time Ts is three times or less of the time period between the fall time t1 of the control signal Vg_u2 and the rise time t3 of the control signal Vg_u1. With this setting, it is possible to avoid malfunction as described above, and yet shorten the time period when the off voltage is variable to a minimum. This permits improvement in the reliability of the switching element.

In this embodiment, the rise time t2 of the signal Vg_off is set to a time after the fall time t1 of the control signal Vg_u2 and before the rise time t3 of the control signal Vg_u1. By this setting, it is possible to avoid malfunction described above reliably while maintaining the switching operation of the lower arm 22u at a desired speed. Moreover, the fall time t4 of the signal Vg_off is set to a time after passing of the given time Ts from the rise time t3 of the control signal Vg_u1. It is desirable to set the given time Ts to be a time period from the rise time t3 of the control signal Vg_u1 until after termination of turn-on operation of the upper arm 21u. By this setting, it is possible to implement a gate drive circuit with high reliability in which malfunction due to switching operation of the upper arm 21u described above is avoided. Furthermore, since the duration of application of a voltage lower than the gate voltage with which the lower arm 22u is kept in its off state can be greatly shortened, the life of the lower arm 22u can be increased.

In the illustrated example, the upper arm 21u turns on after the lower arm 22u has turned off. In the opposite case that the lower arm 22u turns on after the upper arm 21u has turned off, operation opposite to that described above is to be performed. Since such operation is easily inferred from the operation described above, detailed description thereof is omitted here.

In the first embodiment, only the internal configuration of the lower-arm gate drive circuit 24u is shown in FIG. 2. Alternatively, the illustrated internal configuration may be applied to the upper-arm gate drive circuit 23u, or to both the upper-arm gate drive circuit 23u and the lower-arm gate drive circuit 24u.

In the first embodiment, the upper and lower arms are controlled so that, during turn-on operation of one of the arms, a voltage lower than a predetermined off voltage is applied only to the other arm. Alternatively, the arms may be controlled so that, during turn-on operation of an upper arm, for example, a voltage lower than a predetermined off voltage may be applied, not only to the lower arm belonging to the same leg as this upper arm, but also to all the other lower arms belonging to the other legs at the same timing. By controlling the arms in this way, in an inverter circuit, influence of switching operation at another phase can be avoided, permitting implementation of a gate drive circuit with high reliability. Moreover, since the duration of application of a voltage lower than the gate voltage with which the arm is kept in its off state can be greatly shortened, the device life can be increased.

In the case of applying a voltage lower than a predetermined off voltage to all the lower arms belonging to the other legs, the off voltage may be adjusted for each of the lower arms. By this individual adjustment, when the lower arms of the legs are constructed of different types of devices, an optimum off voltage can be applied to each of the types of devices constituting the lower arms. Hence, a gate drive circuit with high reliability can be implemented. Moreover, since the duration of application of a voltage lower than the gate voltage with which the arm is kept in its off state can be greatly shortened, the life of the arm can be increased.

The given time Ts may be changed arbitrarily according to the voltage and current applied to a device constituting an arm. By controlling the arm in this way, influence of switching operation with a different voltage and current can be avoided, and thus termination of turn-on operation or turn-off operation can be detected more precisely. Hence, a gate drive circuit with high reliability can be implemented.

The voltage lower than a predetermined off voltage may be changed arbitrarily according to the voltage and current applied to the device. By controlling the arm in this way, influence of switching operation with a different voltage and current can be avoided, and thus malfunction can be avoided more reliably. Hence, a gate drive circuit with high reliability can be implemented.

(Second Embodiment)

Figure 5:
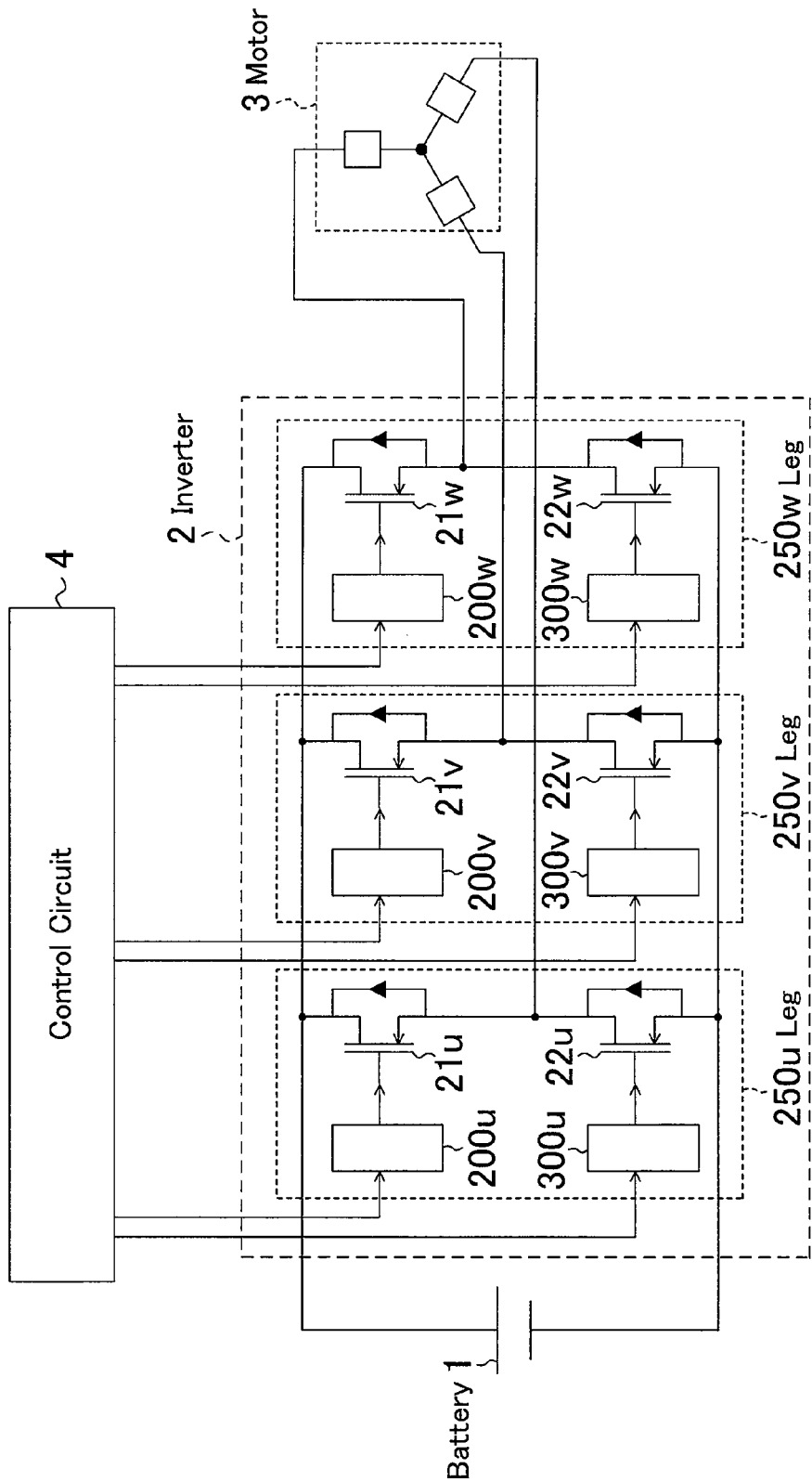
FIG. 5 is a circuit diagram showing the entire schematic configuration of a motor drive system, presented to illustrate a power conversion circuit of a second embodiment of the present invention.

FIG. 5 is a schematic circuit diagram of a motor drive system, presented to illustrate an inverter of a second embodiment to which the present invention is applied. FIG. 5 is different from FIG. 1 only in that the legs 25u, 25v, and 25w are replaced with legs 250u, 250v, and 250w. The other configuration is the same as that of FIG. 1.

Figure 6:
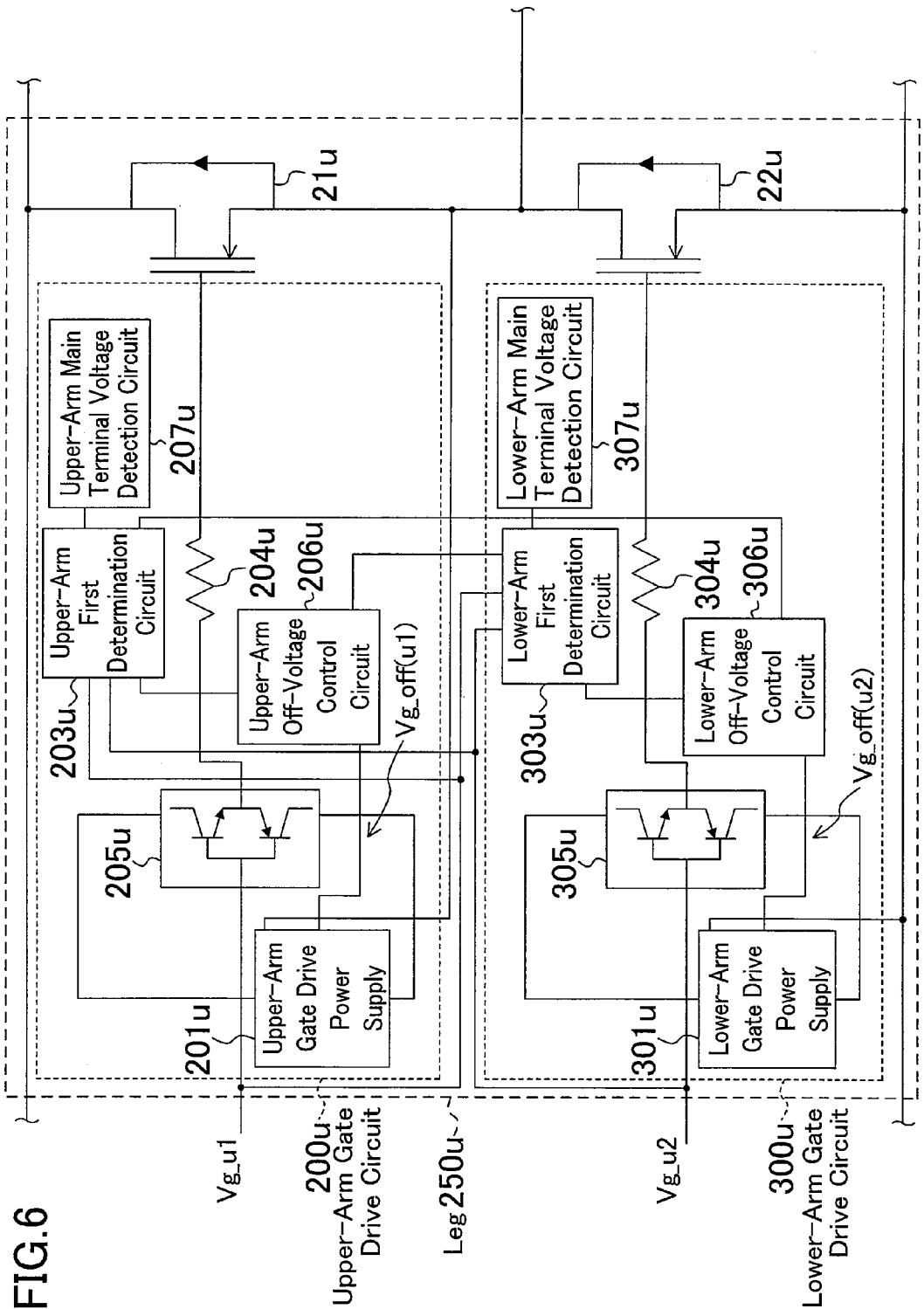
FIG. 6 is a circuit diagram showing the internal configuration of a leg of an inverter of the power conversion circuit.

FIG. 6 is a circuit diagram presented to illustrate the leg 250u in FIG. 5 in detail. The leg 250u includes an upper arm 21u and a lower arm 22u and their corresponding upper-arm gate drive circuit 200u and lower-arm gate drive circuit 300u.

The upper-arm gate drive circuit 200u includes an upper-arm gate drive power supply 201u, an upper-arm first determination circuit 203u, an upper-arm gate resistance 204u, an upper-arm arm-drive circuit 205u, an upper-arm off-voltage control circuit 206u, and an upper-arm main terminal voltage detection circuit 207u. The lower-arm gate drive circuit 300u includes a lower-arm gate drive power supply 301u, a lower-arm first determination circuit 303u, a lower-arm gate resistance 304u, a lower-arm arm-drive circuit 305u, a lower-arm off-voltage control circuit 306u, and a lower-arm main terminal voltage detection circuit 307u. The upper-arm main terminal voltage detection circuit 207u, the upper-arm first determination circuit 203u, the lower-arm main terminal voltage detection circuit 307u, and the lower-arm first determination circuit 303u constitute a signal output circuit for outputting a voltage adjustment signal responding to termination of turn-off operation of the upper arm and the lower arm.

The upper-arm gate drive power supply 201u and the lower-arm gate drive power supply 301u respectively output on voltages of about 10 to 30 V that are based on the source potentials of the upper arm 21u and the lower arm 22u to be driven by the upper-arm gate drive circuit 200u and the lower-arm gate drive circuit 300u, and also output off voltages of about 0 to −30 V that are also based on the source potentials of the upper arm 21u and the lower arm 22u.

Control signals Vg_u1 and Vg_u2 are supplied to the upper-arm gate drive circuit 200u and the lower-arm gate drive circuit 300u. The control signals Vg_u1 and Vg_u2, which are output from the control circuit 4 (not shown in FIG. 6), are signals for controlling the switching operation of the upper arm 21u and the lower arm 22u.

The upper-arm gate drive power supply 201u and the lower-arm gate drive power supply 301u respectively receive the control signals Vg_u1 and Vg_u2, and then output signals corresponding to the control signals Vg_u1 and Vg_u2 to the upper-arm arm-drive circuit 205u and the lower-arm arm-drive circuit 305u. The upper-arm gate drive power supply 201u and the lower-arm gate drive power supply 301u also supply power to the upper-arm arm-drive circuit 205u and the lower-arm arm-drive circuit 305u, respectively. The upper-arm arm-drive circuit 205u and the lower-arm arm-drive circuit 305u perform power amplification for the input signals and output the resultant signals to the control terminals of the upper arm 21u and the lower arm 22u via the upper-arm gate resistance 204u and the lower-arm gate resistance 304u, respectively.

Next, the operation of the upper-arm first determination circuit 203u and the upper-arm main terminal voltage detection circuit 207u will be described. The upper-arm first determination circuit 203u receives the control signals Vg_u1 and Vg_u2 output from the control circuit 4 (not shown in FIG. 6) and also receives a signal output from the upper-arm main terminal voltage detection circuit 207u. The upper-arm main terminal voltage detection circuit 207u detects the voltage value of a main terminal voltage Vds_u1 of the upper arm 21u and outputs the detected value to the upper-arm first determination circuit 203u. The upper-arm first determination circuit 203u then outputs the voltage adjustment signal to the upper-arm off-voltage control circuit 206u.

The upper-arm first determination circuit 203u determines the rise timing of the voltage adjustment signal from on/off of the control signals Vg_u1 and Vg_u2, and determines the fall timing thereof according to the input voltage value of the upper arm 21u. The upper-arm off-voltage control circuit 206u outputs Vg_off(u1) to the upper-arm gate drive power supply 201u according to the signal output from the upper-arm first determination circuit 203u.

According to the Vg_off(u1) signal output from the upper-arm off-voltage control circuit 206u, which is determined from on/off of the signal output from the lower-arm first determination circuit 303u, the upper-arm gate drive power supply 201u changes the output off voltage arbitrarily.

Description on the operation of the lower-arm first determination circuit 303u and the lower-arm main terminal voltage detection circuit 307u is omitted here because the operation is similar to that of the upper-arm first determination circuit 203u and the upper-arm main terminal voltage detection circuit 207u described above.

All of the upper-arm gate drive circuits 200u, 200v, and 200w and the lower-arm gate drive circuits 300u, 300v, and 300w may have the same circuit configuration.

Figure 7:
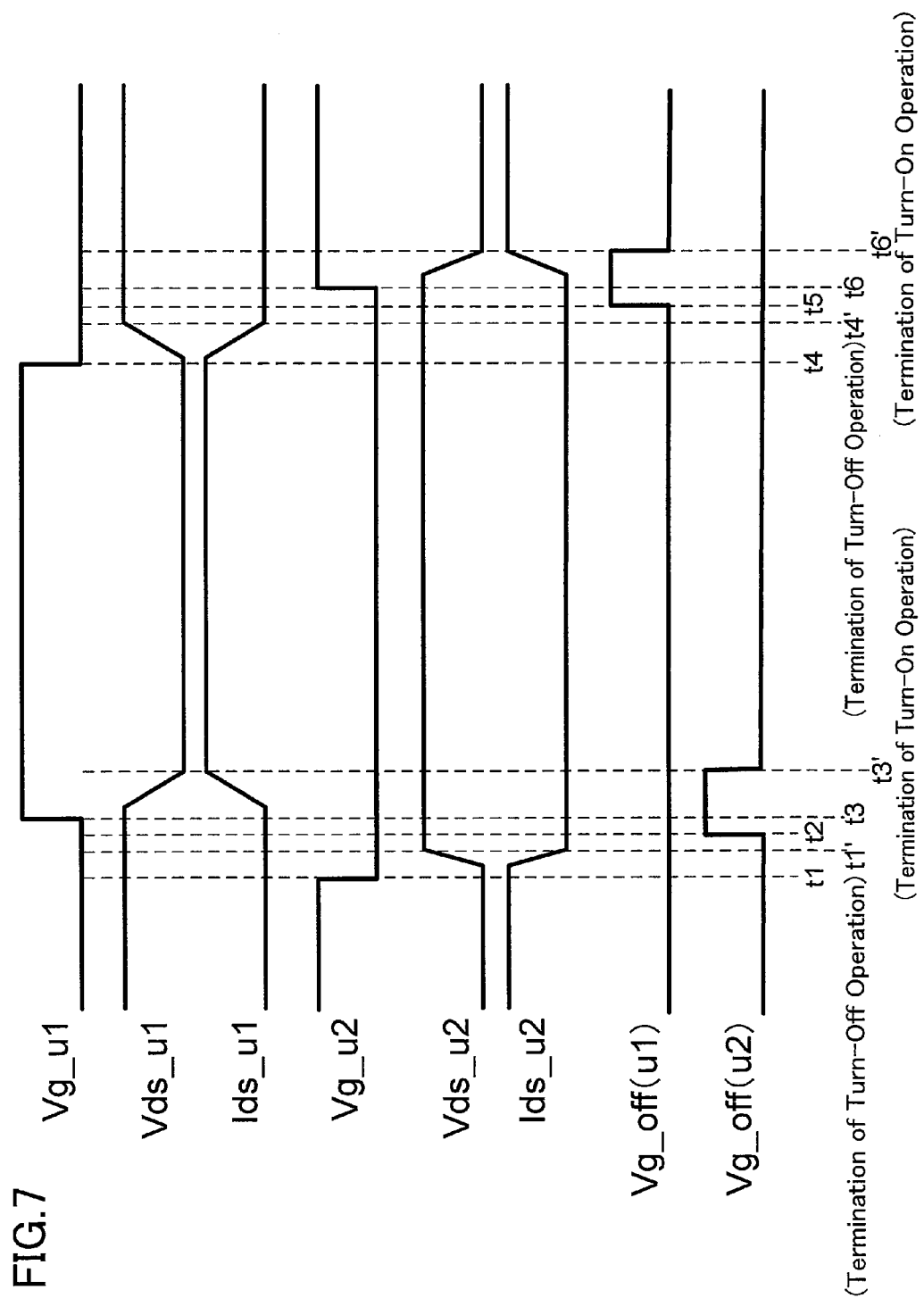
FIG. 7 is a timing chart of operation of an upper-arm gate drive circuit and a lower-arm gate drive circuit of the leg.

Next, the circuit operation of the upper-arm gate drive circuit 200u and the lower-arm gate drive circuit 300u will be described. FIG. 7 is a timing chart illustrating the circuit operation of the upper-arm gate drive circuit 200u and the lower-arm gate drive circuit 300u.

In FIG. 7, Vg_u1 and Vg_u2 are control signals supplied from the control circuit 4 to the upper-arm gate drive circuit 200u and the lower-arm gate drive circuit 300u. Vds_u1 and Vds_u2 are main terminal voltages, and Ids_u1 and Ids_u2 are main terminal currents, between main terminals of the upper arm 21u and the lower arm 22u, respectively. Vg_off (u1) and Vg_off(u2) are output signals of the upper-arm off-voltage control circuit 206u and the lower-arm off-voltage control circuit 306u, respectively.

In general, the following are known on the operation of switch elements. That is, the switching states of the upper arm 21u and the lower arm 22u can be grasped by detecting the main terminal voltages Vds_u1 and Vds_u2 of the upper arm 21u and the lower arm 22u, respectively, and comparing the detected values with a reference value. In other words, the time points of termination of turn-on operation and turn-off operation can be detected precisely and immediately.

Likewise, the switching states of the upper arm 21u and the lower arm 22u can be grasped by detecting the main terminal currents Ids_u1 and Ids_u2 of the upper arm 21u and the lower arm 22u, respectively, and comparing the detected values with a reference value. In other words, the time points of termination of turn-on operation and turn-off operation can be detected precisely and immediately.

Likewise, the switching states of the upper arm 21u and the lower arm 22u can be grasped by detecting control terminal voltages Vgs_u1 and Vgs_u2 of the upper arm 21u and the lower arm 22u, respectively, and comparing the detected values with a reference value. In other words, the time points of termination of turn-on operation and turn-off operation can be detected precisely and immediately.

Specific operation in this embodiment will be described hereinafter based on the knowledge described above. First, the control signal Vg_u2 changes to the off state from the state where the control signal Vg_u1 is off and the control signal Vg_u2 is on (time t1 in FIG. 7). Since Vg_u2 is a control signal, not a drive signal for directly driving the arm, the voltage value of Vds_u2 starts rising, and the current value of Ids_u2 starts falling in synchronization with this rise, after the lapse of a predetermined delay time from Vg_u2.

As the switching proceeds, Vds_u2 finally becomes approximately equal to the voltage value of the battery 1, and Ids_u2 becomes approximately zero (time t1' in FIG. 7). This state indicates that the turn-off operation has terminated. The voltage value of Vds_u2 is detected by the lower-arm main terminal voltage detection circuit 307u. The lower-arm first determination circuit 303u determines whether or not the voltage value has exceeded a predetermined value, and if it has exceeded, outputs a determination signal (not shown) to the lower-arm off-voltage control circuit 306u. According to the determination signal, the Vg_off(u2) signal output from the lower-arm off-voltage control circuit 306u to the lower-arm gate drive power supply 301u changes to the on state (time t2 in FIG. 7). The time t2 may be at and after time t1': it may be approximately the same timing. Receiving the Vg_off (u2) signal, the lower-arm gate drive power supply 301u decreases its output voltage to a voltage too low to be affected by a voltage fluctuation due to high dv/dt.

Subsequently, Vg_u1 changes to the on state (time t3 in FIG. 7). Since Vg_u1 is a control signal, not a drive signal for directly driving the arm, the voltage value of Vds_u1 starts falling, and the current value of Ids_u1 starts rising in synchronization with this fall, after the lapse of a predetermined delay time from Vg_u1. As the switching proceeds, Vds_u1 finally becomes approximately equal to the voltage value of the battery 1, and Ids_u1 becomes approximately zero (time t3' in FIG. 7). This state indicates that the turn-on operation has terminated.

The voltage value of Vds_u1 is detected by the upper-arm main terminal voltage detection circuit 207u. The upper-arm first determination circuit 203u determines whether or not the voltage value is less than a 1 A reference value, and if it is less than the reference value, outputs a determination signal (not shown) to the lower-arm off-voltage control circuit 306u. According to the determination signal, the Vg_off(u2) signal output from the lower-arm off-voltage control circuit 306u to the lower-arm gate drive power supply 301u changes to the off state.

In the upper-arm first determination circuit 203u, it is desirable that the 1 A reference value used for the determination is 10% or less of the voltage value of the battery 1 applied when the upper arm is off. With this setting, the time of termination of the turn-on operation of the upper arm can be detected correctly, permitting improvement in the reliability of the switching element.

Thereafter, after the state where Vg_u1 is on and Vg_u2 is off continues for a while, Vg_u1 changes to the off state (time t4 in FIG. 7). Since Vg_u1 is a control signal, not a drive signal for directly driving the arm, the voltage value of Vds_u1 starts rising, and the current value of Ids_u1 starts falling in synchronization with this rise, after the lapse of a predetermined delay time from Vg_u1. As the switching proceeds, Vds_u1 finally becomes approximately equal to the voltage value of the battery 1, and Ids_u1 becomes approximately zero (time 4t' in FIG. 7).

The above state indicates that the turn-off operation has terminated. The voltage value of Vds_u1 is detected by the upper-arm main terminal voltage detection circuit 207u. The upper-arm first determination circuit 203u determines whether or not the voltage value has exceeded a predetermined value, and if it has exceeded, outputs a determination signal (not shown) to the upper-arm off-voltage control circuit 206u. According to the determination signal, the Vg_off (u1) signal output from the upper-arm off-voltage control circuit 206*u* to the upper-arm gate drive power supply 201*u* changes to the on state (time t5 in FIG. 7). The time t5 may be at and after time t4': it may be approximately the same timing. Receiving the Vg_off(u1) signal, the upper-arm gate drive power supply 201*u* decreases its output voltage to a voltage too low to be affected by a voltage fluctuation due to high dv/dt.

Subsequently, Vg_u2 changes to the on state (time t6 in FIG. 7). Since Vg_u2 is a control signal, not a drive signal for directly driving the arm, the voltage value of Vds_u2 starts falling, and the current value of Ids_u2 starts rising in synchronization with this fall, after the lapse of a predetermined delay time from Vg_u2. As the switching proceeds, Vds_u2 finally becomes approximately equal to the voltage value of the battery 1, and Ids_u2 becomes approximately zero (time t6' in FIG. 7). This state indicates that the turn-on operation has terminated.

The voltage value of Vds_u2 is detected by the lower-arm main terminal voltage detection circuit 307*u*. The lower-arm first determination circuit 303*u* determines whether or not the voltage value is less than a 1 B reference value, and if it is less than the reference value, outputs a determination signal (not shown) to the upper-arm off-voltage control circuit 206*u*. According to the determination signal, the Vg_off(u1) signal output from the upper-arm off-voltage control circuit 206*u* to the upper-arm gate drive power supply 201*u* changes to the off state.

In the lower-arm first determination circuit 303*u*, it is desirable that the 1 B reference value used for the determination is 10% or less of the voltage value of the battery 1 applied when the lower arm is off. With this setting, the time of termination of the turn-on operation of the lower arm can be detected correctly, permitting improvement in the reliability of the switching element.

Accordingly, a gate drive circuit with high reliability can be implemented, in which short-circuiting through the upper/lower arms due to high-frequency switching operation causing high dv/dt is avoided. Moreover, since the duration of application of a voltage lower than the gate voltage with which the arm is kept in its off state can be greatly shortened, the device life can be increased.

(Third Embodiment)

Another embodiment of the present invention will be described with reference to FIG. 8.

Figure 8:
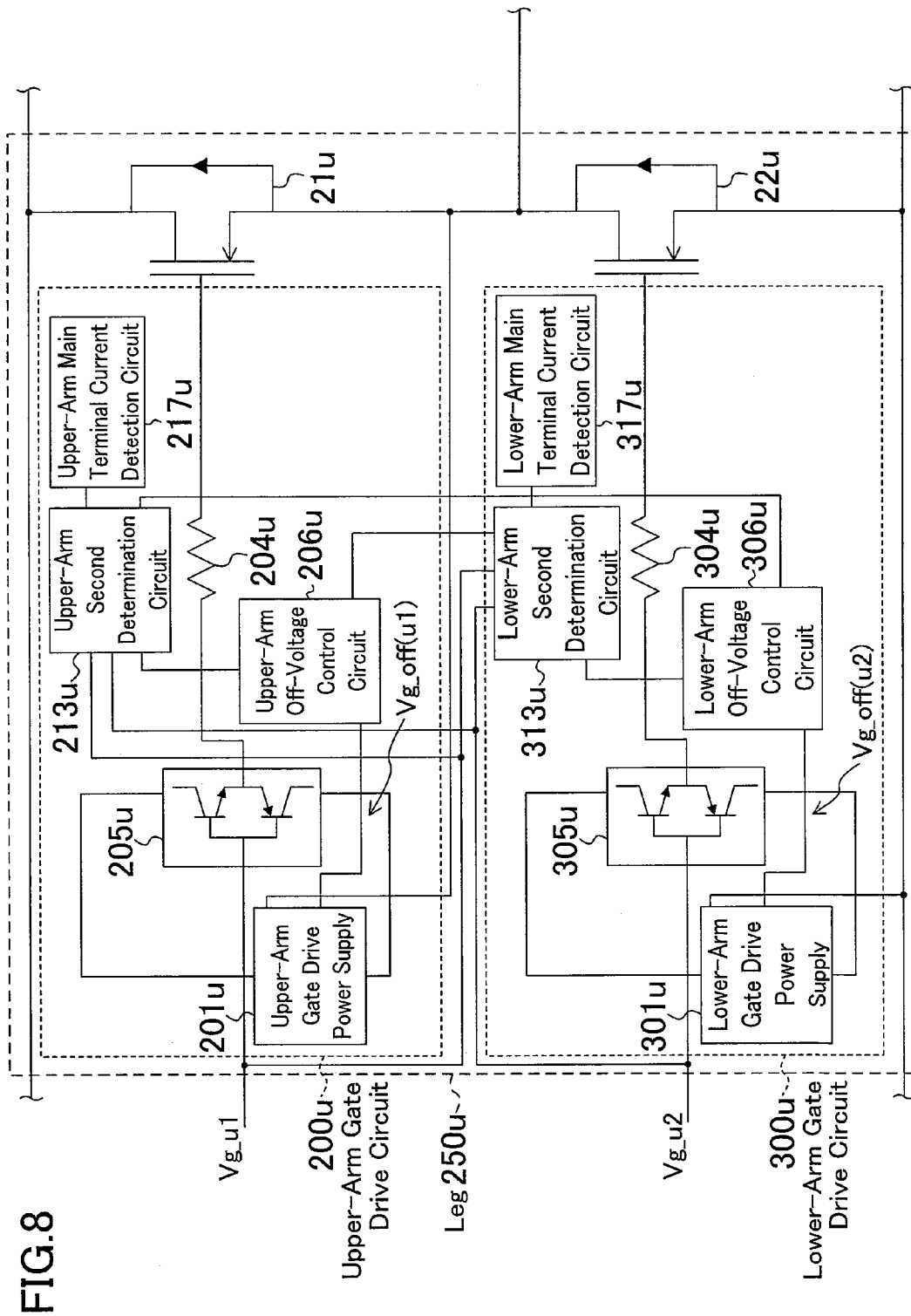
FIG. 8 is a circuit diagram showing the internal configuration of a leg of an inverter of a power conversion circuit of a third embodiment of the present invention.

FIG. 8 is a circuit diagram presented to illustrate the leg 250*u* in FIG. 5 in detail. The circuit diagram of FIG. 8 is different from that of FIG. 6 in that the upper-arm main terminal voltage detection circuit 207*u* and the lower-arm main terminal voltage detection circuit 307*u* are replaced with an upper-arm main terminal current detection circuit 217*u* and a lower-arm main terminal current detection circuit 317*u*, and that the upper-arm first determination circuit 203*u* and the lower-arm first determination circuit 303*u* are replaced with an upper-arm second determination circuit 213*u* and a lower-arm second determination circuit 313*u*. The other configuration is the same as that of FIG. 6, and thus description thereof is omitted here.

The upper-arm main terminal current detection circuit 217*u* and the lower-arm main terminal current detection circuit 317*u* respectively detect inter-main terminal currents of the arms for the upper-arm gate drive circuit 200*u* and the lower-arm gate drive circuit 300*u*, and output signals corresponding to the detected values to the upper-arm second determination circuit 213*u* and the lower-arm second determination circuit 313*u*. The upper-arm second determination circuit 213*u* and the lower-arm second determination circuit 313*u* output signals to the upper-arm off-voltage control circuit 206*u* and the lower-arm off-voltage control circuit 306*u*, according to the control signals Vg_u1 and Vg_u2 for controlling the switching of the upper arm 21*u* and the lower arm 22*u* and the output signals of the upper-arm main terminal current detection circuit 213*u* and the lower-arm main terminal current detection circuit 313*u*. The upper-arm off-voltage control circuit 206*u* and the lower-arm off-voltage control circuit 306*u* respectively output Vg_off(u1) and Vg_off(u2) to the upper-arm gate drive power supply 201*u* and the lower-arm gate drive power supply 301*u* according to the output signals of the upper-arm second determination circuit 213*u* and the lower-arm second determination circuit 313*u*, to allow the upper-arm gate drive power supply 201*u* and the lower-arm gate drive power supply 301*u* to change their output voltages to arbitrary values. The upper-arm arm-drive circuit 205*u* and the lower-arm arm-drive circuit 305*u*, receiving power from the upper-arm gate drive power supply 201*u* and the lower-arm gate drive power supply 301*u*, output signals corresponding to the control signals Vg_u1 and Vg_u2 to the upper arm 21*u* and the lower arm 22*u* via the upper-arm gate resistance 204*u* and the lower-arm gate resistance 304*u*, respectively, to permit switching operation of the upper arm 21*u* and the lower arm 22*u*.

It is desirable that the upper-arm gate drive circuits 200*u*, 200*v*, and 200*w* and the lower-arm gate drive circuits 300*u*, 300*v*, and 300*w* have the same circuit configuration.

Next, the circuit operation of the upper-arm gate drive circuit 200*u* and the lower-arm gate drive circuit 300*u* will be described. FIG. 7 is a timing chart illustrating the circuit operation of the upper-arm gate drive circuit 200*u* and the lower-arm gate drive circuit 300*u*.

In FIG. 7, Vg_u1 and Vg_u2 are control signals supplied from the control circuit 4 to the upper-arm gate drive circuit 200*u* and the lower-arm gate drive circuit 300*u*. Vds_u1 and Vds_u2 are main terminal voltages, and Ids_u1 and Ids_u2 are main terminal currents, between main terminals of the upper arm 21*u* and the lower arm 22*u*, respectively. Vg_off(u1) and Vg_off(u2) are output signals of the upper-arm off-voltage control circuit 206*u* and the lower-arm off-voltage control circuit 306*u*, respectively.

Next, specific operation in this embodiment will be described.

First, Vg_u2 changes to the off state from the state where Vg_u1 is off and Vg_u2 is on (time t1 in FIG. 7). Since Vg_u2 is a control signal, not a drive signal for directly driving the arm, the voltage value of Vds_u2 starts rising, and the current value of Ids_u2 starts falling in synchronization with this rise, after the lapse of a predetermined delay time from Vg_u2. As the switching proceeds, Vds_u2 finally becomes approximately equal to the voltage value of the battery 1, and Ids_u2 becomes approximately zero (time t1' in FIG. 7). This state indicates that the turn-off operation has terminated. The current value of Ids_u2 is detected by the lower-arm main terminal current detection circuit 317*u*. The lower-arm second determination circuit 313*u* determines whether or not the current value is less than a predetermined value, and if it is less than the predetermined value, outputs a determination signal (not shown) to the lower-arm off-voltage control circuit 306*u*. According to the determination signal, the Vg_off(u2) signal output from the lower-arm off-voltage control circuit 306*u* to the lower-arm gate drive power supply 301*u* changes to the on state (time t2 in FIG. 7). The time t2 may be at and after time t1': it may be approximately the same timing. Receiving the Vg_off(u2) signal, the lower-arm gate drive power supply 301*u* decreases its output voltage to a voltage too low to be affected by a voltage fluctuation due to high dv/dt.

Subsequently, Vg_u1 changes to the on state (time t3 in FIG. 7). Since Vg_u1 is a control signal, not a drive signal for directly driving the arm, the voltage value of Vds_u1 starts falling, and the current value of Ids_u1 starts rising in synchronization with this fall, after the lapse of a predetermined delay time from Vg_u1. As the switching proceeds, Vds_u1 finally becomes approximately equal to the voltage value of the battery 1, and Ids_u1 becomes approximately zero (time t3' in FIG. 7). This state indicates that the turn-on operation has terminated.

The current value of Ids_u1 is detected by the upper-arm main terminal current detection circuit 217$u$. The upper-arm second determination circuit 213$u$ determines whether or not the current value has exceeded a 2 A reference value, and if it has exceeded, outputs a determination signal (not shown) to the lower-arm off-voltage control circuit 306$u$.

In the upper-arm second determination circuit 213$u$, it is desirable that the 2 A reference value used for the determination is 90% or more of the maximum current value applied when the upper arm is off. With this setting, the time of termination of the turn-on operation of the upper arm can be detected correctly, permitting improvement in the reliability of the switching element.

According to the determination signal, the Vg_off(u2) signal output from the lower-arm off-voltage control circuit 306$u$ to the lower-arm gate drive power supply 301$u$ changes to the off state. Thereafter, after the state where Vg_u1 is on and Vg_u2 is off continues for a while, Vg_u1 changes to the off state (time t4 in FIG. 7). Since Vg_u1 is a control signal, not a drive signal for directly driving the arm, the voltage value of Vds_u1 starts rising, and the current value of Ids_u1 starts falling in synchronization with this rise, after the lapse of a predetermined delay time from Vg_u1. As the switching proceeds, Vds_u1 finally becomes approximately equal to the voltage value of the battery 1, and Ids_u1 becomes approximately zero (time t4' in FIG. 7). The above state indicates that the turn-off operation has terminated. The current value of Ids_u1 is detected by the upper-arm main terminal current detection circuit 217$u$. The upper-arm second determination circuit 213$u$ determines whether or not the current value is less than a 2 B reference value, and if it is less than the reference value, outputs a determination signal (not shown) to the upper-arm off-voltage control circuit 206$u$.

In the upper-arm second determination circuit 213$u$, it is desirable that the 2 B reference value used for the determination is 10% or more of the maximum current value applied when the upper arm is on. With this setting, the time of termination of the turn-off operation of the upper arm can be detected correctly, permitting improvement in the reliability of the switching element.

According to the determination signal, the Vg_off(u1) signal output from the upper-arm off-voltage control circuit 206$u$ to the upper-arm gate drive power supply 201$u$ changes to the on state (time t5 in FIG. 7). The time t5 may be at and after time t4': it may be approximately the same timing. Receiving the Vg_off(u1) signal, the upper-arm gate drive power supply 201$u$ decreases its output voltage to a voltage too low to be affected by a voltage fluctuation due to high dv/dt. Subsequently, Vg_u2 changes to the on state (time t6 in FIG. 7). Since Vg_u2 is a control signal, not a drive signal for directly driving the arm, the voltage value of Vds_u2 starts falling, and the current value of Ids_u2 starts rising in synchronization with this fall, after the lapse of a predetermined delay time from Vg_u2. As the switching proceeds, Vds_u2 finally becomes approximately equal to the voltage value of the battery 1, and Ids_u2 becomes approximately zero (time t6' in FIG. 7). This state indicates that the turn-on operation has terminated.

The current value of Ids_u2 is detected by the lower-arm main terminal current detection circuit 317$u$. The lower-arm second determination circuit 313$u$ determines whether or not the current value has exceeded a predetermined value, and if has exceeded, outputs a determination signal (not shown) to the upper-arm off-voltage control circuit 206$u$. According to the determination signal, the Vg_off(u1) signal output from the upper-arm off-voltage control circuit 206$u$ to the upper-arm gate drive power supply 201$u$ changes to the off state.

Accordingly, a gate drive circuit with high reliability can be implemented, in which short-circuiting through the upper/lower arms due to high-frequency switching operation causing high dv/dt is avoided. Moreover, since the duration of application of a voltage lower than the gate voltage with which the arm is kept in its off state can be greatly shortened, the device life can be increased.

(Fourth Embodiment)

Yet another embodiment of the present invention will be described with reference to FIG. 9.

Figure 9:
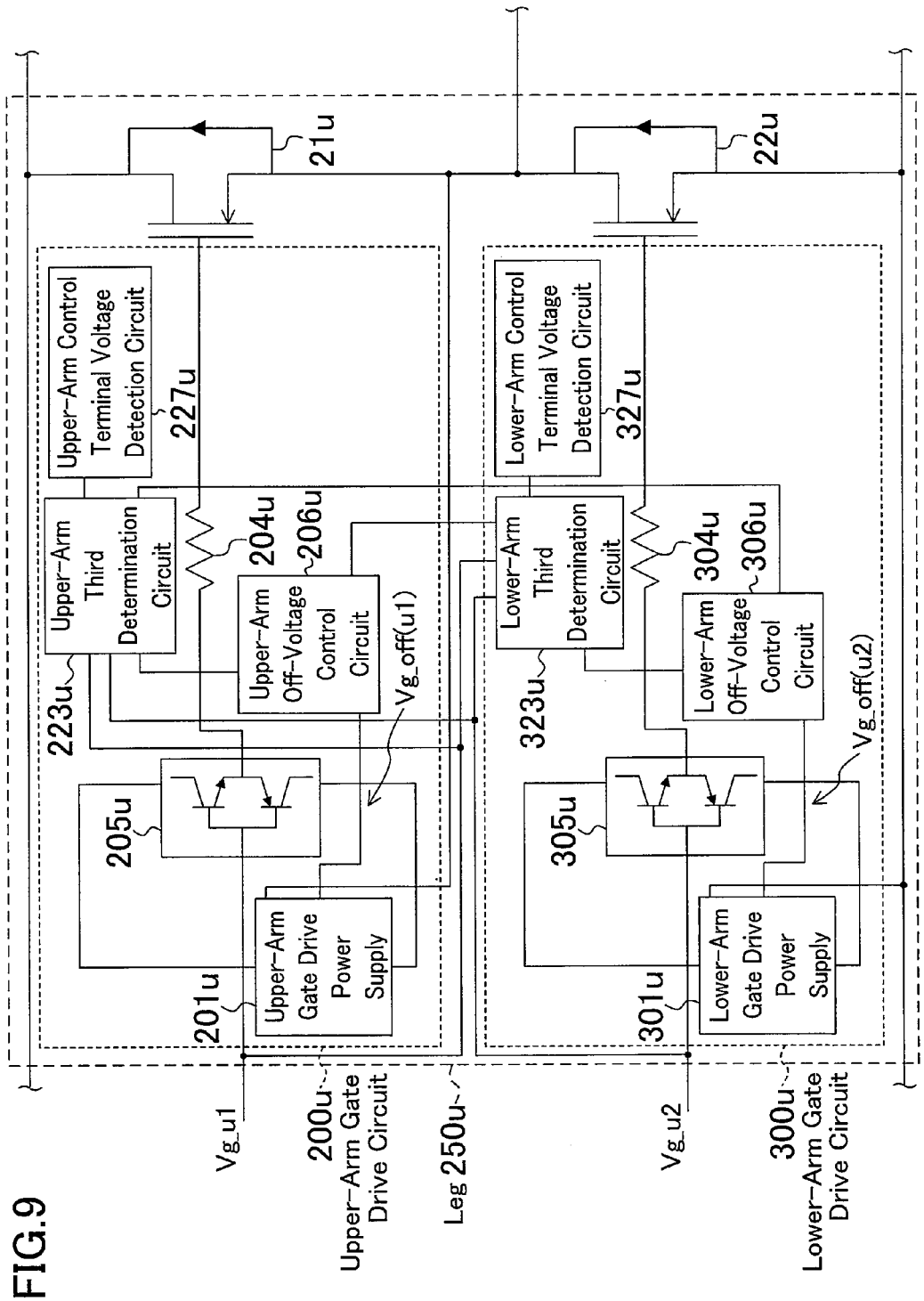
FIG. 9 is a circuit diagram showing the internal configuration of a leg of an inverter of a power conversion circuit of a fourth embodiment of the present invention.

FIG. 9 is a circuit diagram presented to illustrate the leg 250$u$ in FIG. 5 in detail.

The circuit diagram of FIG. 9 is different from that of FIG. 6 in that the upper-arm main terminal voltage detection circuit 207$u$ and the lower-arm main terminal voltage detection circuit 307$u$ are replaced with an upper-arm control terminal voltage detection circuit 227$u$ and a lower-arm control terminal voltage detection circuit 327$u$, and that the upper-arm first determination circuit 203$u$ and the lower-arm first determination circuit 303$u$ are replaced with an upper-arm third determination circuit 223$u$ and a lower-arm third determination circuit 323$u$. The other configuration is the same as that of FIG. 6, and thus description thereof is omitted here.

The upper-arm control terminal voltage detection circuit 227$u$ and the lower-arm control terminal voltage detection circuit 327$u$ respectively detect inter-control terminal voltages (gate-source voltages Vgs) of the arms for the upper-arm gate drive circuit 200$u$ and the lower-arm gate drive circuit 300$u$, and output signals corresponding to the detected values to the upper-arm third determination circuit 223$u$ and the lower-arm third determination circuit 323$u$. The upper-arm third determination circuit 223$u$ and the lower-arm third determination circuit 323$u$ output signals to the upper-arm off-voltage control circuit 206$u$ and the lower-arm off-voltage control circuit 306$u$, according to the control signals Vg_u1 and Vg_u2 for controlling the switching of the upper arm 21$u$ and the lower arm 22$u$ and the output signals of the upper-arm control terminal voltage detection circuit 223$u$ and the lower-arm control terminal voltage detection circuit 323$u$. The upper-arm off-voltage control circuit 206$u$ and the lower-arm off-voltage control circuit 306$u$ respectively output Vg_off(u1) and Vg_off(u2) to the upper-arm gate drive power supply 201$u$ and the lower-arm gate drive power supply 301$u$ according to the output signals of the upper-arm third determination circuit 223$u$ and the lower-arm third determination circuit 323$u$, to allow the upper-arm gate drive power supply 201$u$ and the lower-arm gate drive power supply 301$u$ to change their off voltages to arbitrary values. The upper-arm arm-drive circuit 205$u$ and the lower-arm arm-drive circuit 305$u$, receiving power from the upper-arm gate drive power supply 201$u$ and the lower-arm gate drive power supply 301$u$, output signals corresponding to the control signals Vg_u1 and Vg_u2 to the upper arm 21$u$ and the lower arm 22$u$ via the upper-arm gate resistance 204$u$ and the lower-arm gate resistance 304*u*, respectively, to permit switching operation of the upper arm 21*u* and the lower arm 22*u*.

It is desirable that the upper-arm gate drive circuits 200*u*, 200*v*, and 200*w* and the lower-arm gate drive circuits 300*u*, 300*v*, and 300*w* have the same circuit configuration.

Figure 10:
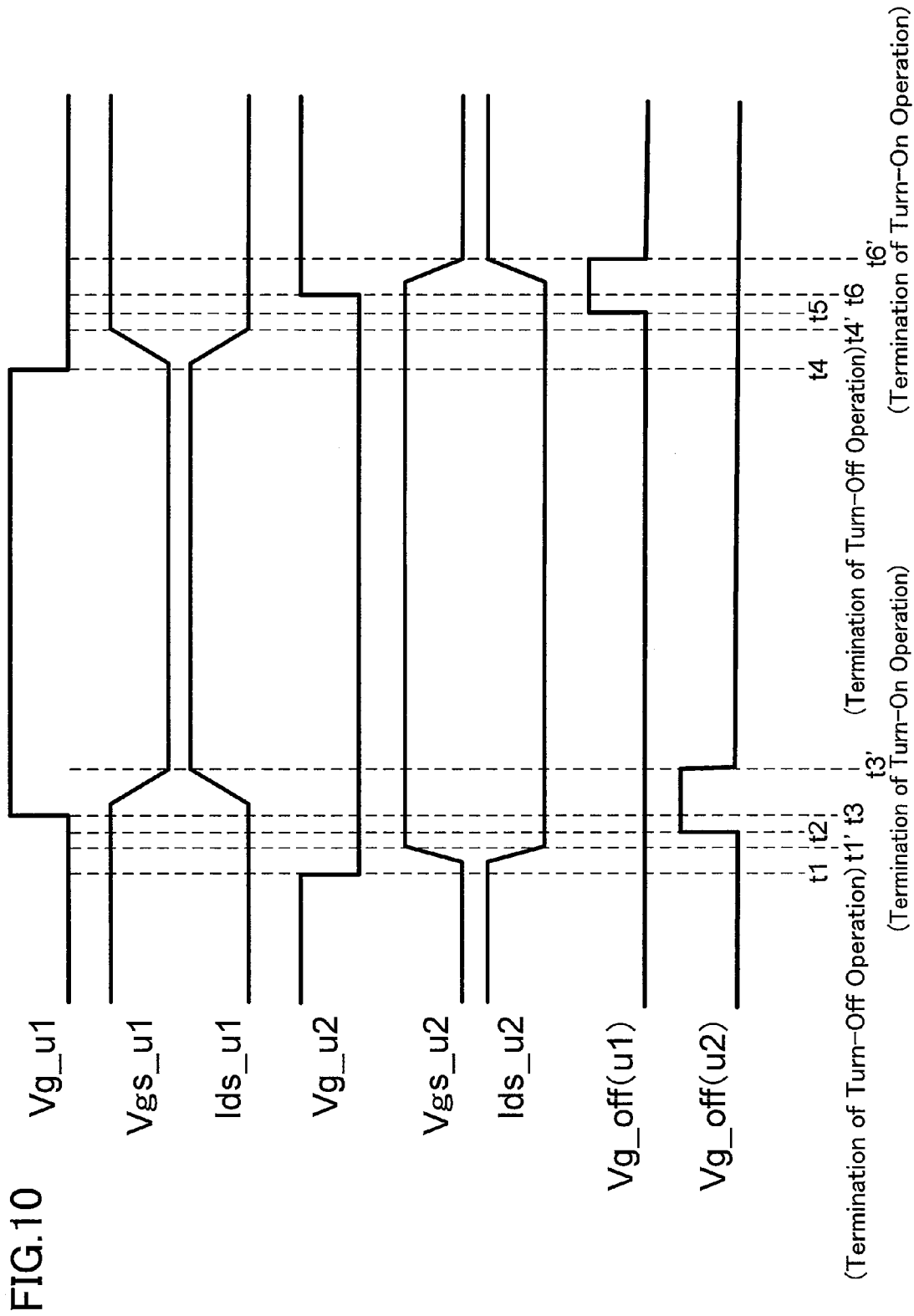
FIG. 10 is a timing chart of operation of an upper-arm gate drive circuit and a lower-arm gate drive circuit of the leg.

Next, the circuit operation of the upper-arm gate drive circuit 200*u* and the lower-arm gate drive circuit 300*u* will be described. FIG. 10 is a timing chart illustrating the circuit operation of the upper-arm gate drive circuit 200*u* and the lower-arm gate drive circuit 300*u*.

In FIG. 10, Vg_u1 and Vg_u2 are control signals supplied from the control circuit 4 to the upper-arm gate drive circuit 200*u* and the lower-arm gate drive circuit 300*u*. Vgs_u1 and Vgs_u2 are control terminal voltages, and Ids_u1 and Ids_u2 are main terminal currents, of the upper arm 21*u* and the lower arm 22*u*, respectively.

Vg_off(u1) and Vg_off(u2) are output signals of the upper-arm off-voltage control circuit 206*u* and the lower-arm off-voltage control circuit 306*u*, respectively.

Next, specific operation in this embodiment will be described.

First, Vg_u2 changes to the off state from the state where Vg_u1 is off and Vg_u2 is on (time t1 in FIG. 10). Since Vg_u2 is a control signal, not a drive signal for directly driving the arm, the voltage value of Vgs_u2 starts rising, and the current value of Ids_u2 starts falling in synchronization with this rise, after the lapse of a predetermined delay time from Vg_u2. As the switching proceeds, Vgs_u2 finally becomes approximately equal to the voltage value of the on-power supply 301*u*, and Ids_u2 becomes approximately zero (time t1' in FIG. 10). This state indicates that the turn-off operation has terminated. The voltage value of Vgs_u2 is detected by the lower-arm control terminal voltage detection circuit 327*u*. The lower-arm third determination circuit 323*u* determines whether or not the voltage value has exceeded a predetermined value, and if it has exceeded, outputs a determination signal (not shown) to the lower-arm off-voltage control circuit. 306*u*. According to the determination signal, the Vg_off(u2) signal output from the lower-arm off-voltage control circuit 306*u* to the lower-arm gate drive power supply 301*u* changes to the on state (time t2 in FIG. 10). The time t2 may be at and after time t1': it may be approximately the same timing. Receiving the Vg_off(u2) signal, the lower-arm gate drive power supply 301*u* decreases its output voltage to a voltage too low to be affected by a voltage fluctuation due to high dv/dt.

Subsequently, Vg_u1 changes to the on state (time t3 in FIG. 10). Since Vg_u1 is a control signal, not a drive signal for directly driving the arm, the voltage value of Vgs_u1 starts falling, and the current value of Ids_u1 starts rising in synchronization with this fall, after the lapse of a predetermined delay time from Vg_u1. As the switching proceeds, Vgs_u1 finally becomes approximately equal to the voltage value of the on-power supply 201*u*, and Ids_u1 becomes approximately zero (time t3' in FIG. 10). This state indicates that the turn-on operation has terminated.

The voltage value of Vgs_u1 is detected by the upper-arm control terminal voltage detection circuit 227*u*. The upper-arm third determination circuit 223*u* determines whether or not the voltage value is less than a predetermined value, and if it is less than the predetermined value, outputs a determination signal (not shown) to the lower-arm off-voltage control circuit 306*u*.

According to the determination signal, the Vg_off(u2) signal output from the lower-arm off-voltage control circuit 306*u* to the lower-arm gate drive power supply 301*u* changes to the off state.

Thereafter, after the state where Vg_u1 is on and Vg_u2 is off continues for a while, Vg_u1 changes to the off state (time t4 in FIG. 10). Since Vg_u1 is a control signal, not a drive signal for directly driving the arm, the voltage value of Vgs_u1 starts rising, and the current value of Ids_u1 starts falling in synchronization with this rise, after the lapse of a predetermined delay time from Vg_u1. As the switching proceeds, Vgs_u1 finally becomes approximately equal to the voltage value of the upper-arm gate drive power supply 201*u*, and Ids_u1 becomes approximately zero (time t4' in FIG. 10). The above state indicates that the turn-off operation has terminated. The voltage value of Vgs_u1 is detected by the upper-arm control terminal voltage detection circuit 227*u*. The upper-arm third determination circuit 223*u* determines whether or not the voltage value has exceeded a 3 A reference value, and if it has exceeded, outputs a determination signal (not shown) to the upper-arm off-voltage control circuit 206*u*.

In the upper-arm third determination circuit 223*u*, it is desirable that the 3 A reference value used for the determination is 90% or more of the voltage value of the control terminal applied when the upper arm is turned on. With this setting, the time of termination of the turn-off operation of the upper arm can be detected correctly, permitting improvement in the reliability of the switching element. Moreover, it is desirable that the 3 A reference value is set according to the value of the gate resistance connected to the control terminal. In general, the greater the gate resistance value, the more the timing of turn-on or turn-off operation of the switching element delays behind the on or off timing of the control terminal. Therefore, it is desirable to set the 3 A reference value to a higher percentage of the voltage value of the battery 1 as the gate resistance value connected to the control terminal is larger. With this setting, the reliability of the switching element can be improved.

According to the determination signal, the Vg_off(u1) signal output from the upper-arm off-voltage control circuit 206*u* to the upper-arm gate drive power supply 201*u* changes to the on state (time t5 in FIG. 10). The time t5 may be at and after time t4': it may be approximately the same timing. Receiving the Vg_off(u1) signal, the upper-arm gate drive power supply 201*u* decreases its output voltage to a voltage too low to be affected by a voltage fluctuation due to high dv/dt.

Subsequently, Vg_u2 changes to the on state (time t6 in FIG. 10). Since Vg_u2 is a control signal, not a drive signal for directly driving the arm, the voltage value of Vgs_u2 starts falling, and the current value of Ids_u2 starts rising in synchronization with this fall, after the lapse of a predetermined delay time from Vg_u2. As the switching proceeds, Vgs_u2 finally becomes approximately equal to the voltage value of the lower-arm gate drive power supply 301*u*, and Ids_u2 becomes approximately zero (time t6' in FIG. 10). This state indicates that the turn-on operation has terminated.

The voltage value of Vgs_u2 is detected by the lower-arm control terminal voltage detection circuit 327*u*. The lower-arm third determination circuit 323*u* determines whether or not the voltage value is less than a 3 B reference value, and if it is less than the reference value, outputs a determination signal (not shown) to the upper-arm off-voltage control circuit 206*u*.

In the lower-arm third determination circuit 323*u*, it is desirable that the 3 B reference value used for the determination is 10% or more of the voltage value of the control terminal applied when the lower arm is turned off. With this setting, the time of termination of the turn-on operation of the lower arm can be detected correctly, permitting improvement in the reliability of the switching element. Moreover, it is desirable that the 3 B reference value is set according to the value of the gate resistance connected to the control terminal. In general, the greater the gate resistance value, the more the timing of turn-on or turn-off operation of the switching element delays behind the on or off timing of the control terminal. Therefore, it is desirable to set the 3 B reference value to a higher percentage of the voltage value of the battery 1 as the gate resistance value connected to the control terminal is larger. With this setting, the reliability of the switching element can be improved.

According to the determination signal, the Vg_off(u1) signal output from the upper-arm off-voltage control circuit 206*u* to the upper-arm gate drive power supply 201*u* changes to the off state.

Thus, a gate drive circuit with high reliability can be implemented, in which short-circuiting through the upper/lower arms due to high-frequency switching operation causing high dv/dt is avoided. Moreover, since the duration of application of a voltage lower than the gate voltage with which the arm is kept in its off state can be greatly shortened, the device life can be increased.

(Fifth Embodiment)

Yet another embodiment of the present invention will be described with reference to FIG. 11.

Figure 11:
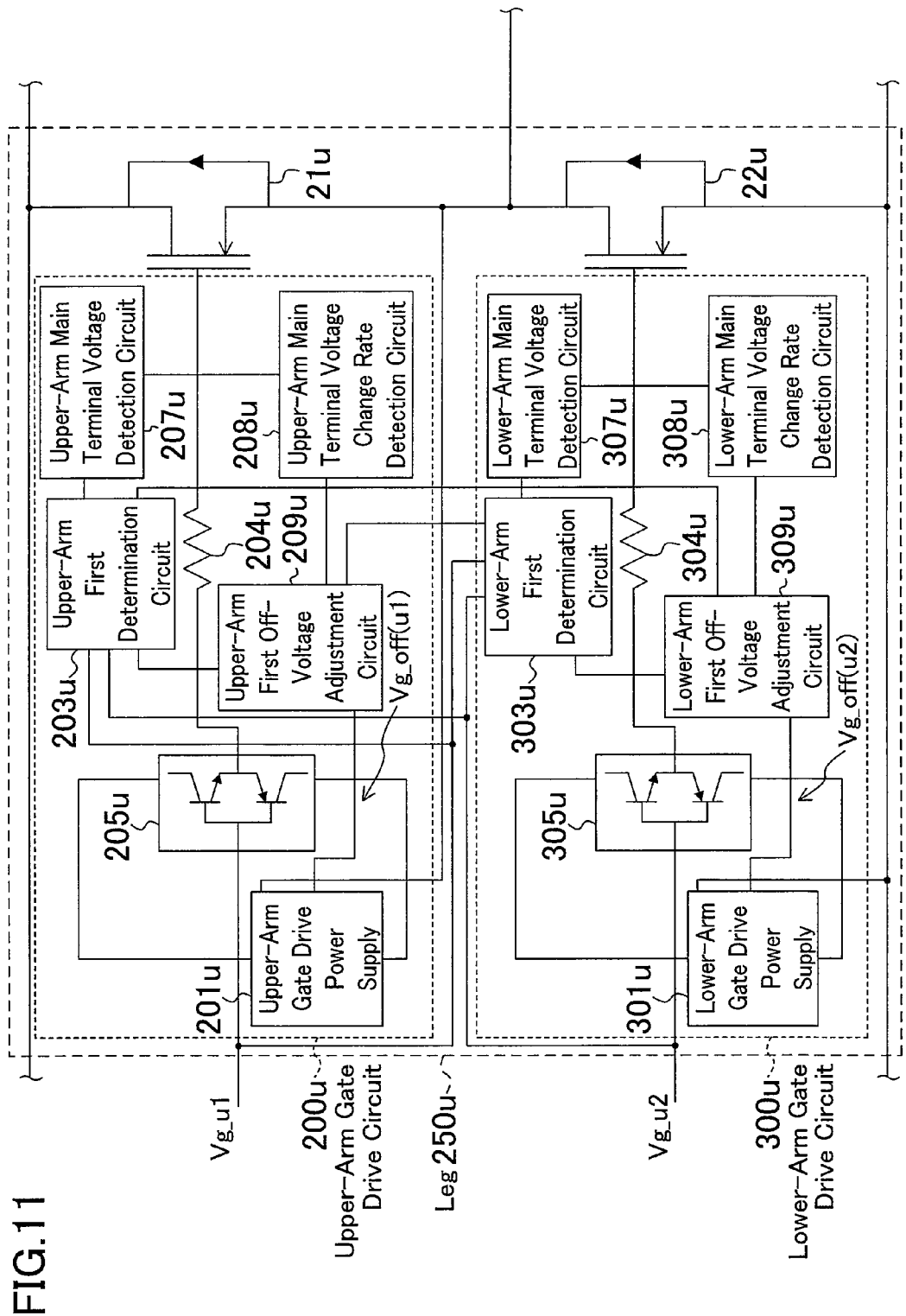
FIG. 11 is a circuit diagram showing the internal configuration of a leg of an inverter of a power conversion circuit of a fifth embodiment of the present invention.

FIG. 11 is a circuit diagram presented to illustrate the leg 250*u* in FIG. 5 in detail. The circuit diagram of FIG. 11 is different from that of FIG. 6 in that an upper-arm main terminal voltage change rate detection circuit 208*u* and a lower-arm main terminal voltage change rate detection circuit 308*u* are added, and that the upper-arm off-voltage control circuit 206*u* and the lower-arm off-voltage control circuit 306*u* are replaced with an upper-arm first off-voltage adjustment circuit 209*u* and a lower-arm first off-voltage adjustment circuit 309*u*. The other configuration is the same as that of FIG. 6, and thus description thereof is omitted here. Note that the "off-voltage control circuit" in the appended claims corresponds to the upper-arm first off-voltage adjustment circuit 209*u* and the lower-arm first off-voltage adjustment circuit 309*u* in the fifth embodiment.

The upper-arm main terminal voltage change rate detection circuit 208*u* and the lower-arm main terminal voltage change rate detection circuit 308*u* respectively detect the time rates of change of the main terminal voltages detected by the upper-arm main terminal voltage detection circuit 207*u* and the lower-arm main terminal voltage detection circuit 307*u* (dv/dt).

The upper-arm first off-voltage adjustment circuit 209*u* and the lower-arm first off-voltage adjustment circuit 309*u* respectively receive the output signals of the upper-arm first determination circuit 203*u* and the lower-arm first determination circuit 303*u* and the output signals of the upper-arm main terminal voltage change rate detection circuit 208*u* and the lower-arm main terminal voltage change rate detection circuit 308*u*, and adjust the output voltages of the upper-arm gate drive power supply 201*u* and the lower-arm gate drive power supply 301*u* according to these signals.

Figure 12:
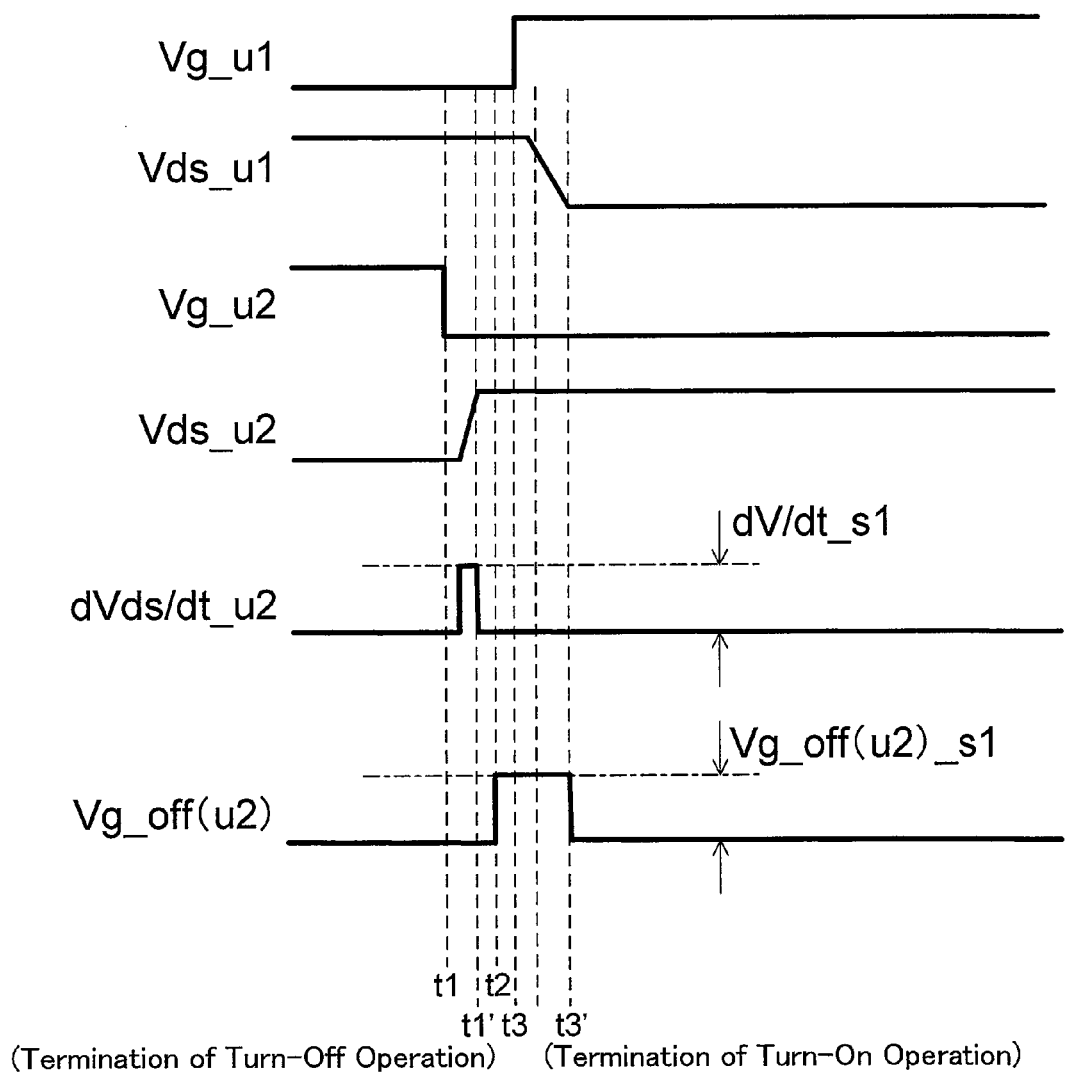
FIG. 12 is a timing chart of operation of an upper-arm gate drive circuit and a lower-arm gate drive circuit of the leg.

Next, the circuit operation of the upper-arm gate drive circuit 200*u* and the lower-arm gate drive circuit 300*u* will be described. FIG. 12 is a timing chart illustrating the circuit operation of the upper-arm gate drive circuit 200*u* and the lower-arm gate drive circuit 300*u*.

Referring to FIG. 12, Vg_u1 and Vg_u2 are control signals supplied from the control circuit 4 to the upper-arm gate drive circuit 200*u* and the lower-arm gate drive circuit 300*u*. Vds_u1 and Vds_u2 are main terminal voltages of the upper arm 21*u* and the lower arm 22*u*, respectively.

Vg_off(u1) and Vg_off(u2) are output signals of the upper-arm first off-voltage adjustment circuit 209*u* and the lower-arm first off-voltage adjustment circuit 309*u*.

Specific operation in this embodiment will be described hereinafter.

First, Vg_u2 changes to the off state from the state where Vg_u1 is off and Vg_u2 is on (time t1 in FIG. 12). Since Vg_u2 is a control signal, not a drive signal for directly driving the arm, the voltage value of Vds_u2 starts rising after the lapse of a predetermined delay time from Vg_u2. As the switching proceeds, Vds_u2 finally becomes approximately equal to the voltage value of the lower-arm gate drive power supply 301*u* (time t1' in FIG. 12). This state indicates that the turn-off operation has terminated. At this time, the lower-arm main terminal voltage change rate detection circuit 308*u* detects a change rate of the main terminal voltage and outputs a detection signal dVds/dt_u2. The output value of the detection signal dVds/dt_u2 depends on the change rate of the main terminal voltage.

The lower-arm first determination circuit 303*u* determines whether or not the voltage value of Vds_u2 has exceeded a predetermined value, and if it has exceeded, outputs a determination signal (not shown) to the lower-arm first off-voltage adjustment circuit 309*u*. According to the determination signal, the Vg_off(u2) signal output from the lower-arm first off-voltage adjustment circuit 309*u* to the lower-arm gate drive power supply 301*u* changes to the on state (time t2 in FIG. 12). The time t2 may be at and after time t1': it may be approximately the same timing.

The output voltage value of Vg_off(u2) is adjusted to correspond to the output voltage value of the output signal dVds/dt_u2 of the lower-arm main terminal voltage change rate detection circuit 308*u* (in the illustrated example, when the value of dVds/dt_u2 is dV/dt_s1, the value of the Vg_off(u2) signal is Vg_off(u2)_s1).

Thereafter, Vg_u1 changes to the on state (time t3 in FIG. 12). Since Vg_u1 is a control signal, not a drive signal for directly driving the arm, the voltage value of Vds_u1 starts falling after the lapse of a predetermined delay time from Vg_u1. As the switching proceeds, Vds_u1 finally becomes approximately equal to the voltage value of the battery 1 (time t3' in FIG. 12). This state indicates that the turn-on operation has terminated.

The voltage value of Vds_u1 is detected by the upper-arm main terminal voltage detection circuit 207*u*. The upper-arm first determination circuit 203*u* determines whether or not the voltage value is less than a predetermined value, and if it is less than the predetermined value, outputs a determination signal (not shown) to the lower-arm first off-voltage adjustment circuit 309*u*. According to the determination signal, the Vg_off(u2) signal output from the lower-arm first off-voltage adjustment circuit 309*u* to the lower-arm gate drive power supply 301*u* changes to the off state.

Thus, a gate drive circuit with high reliability can be implemented, in which short-circuiting through the upper/lower arms due to high-frequency switching operation causing high dv/dt is avoided. Moreover, since the duration of application of a voltage lower than the gate voltage with which the arm is kept in its off state can be greatly shortened, the device life can be increased.

In addition, since the off voltage can be set to a required minimum value according to the change rate of the main terminal voltage, the effect described above can be further increased.

Although the output voltage of the off-power supply was adjusted with the change rate of the main terminal voltage in this embodiment, a similar effect can also be obtained by using the change rate of the main terminal current.

(Sixth Embodiment)

Yet another embodiment of the present invention will be described with reference to FIG. 13.

Figure 13:
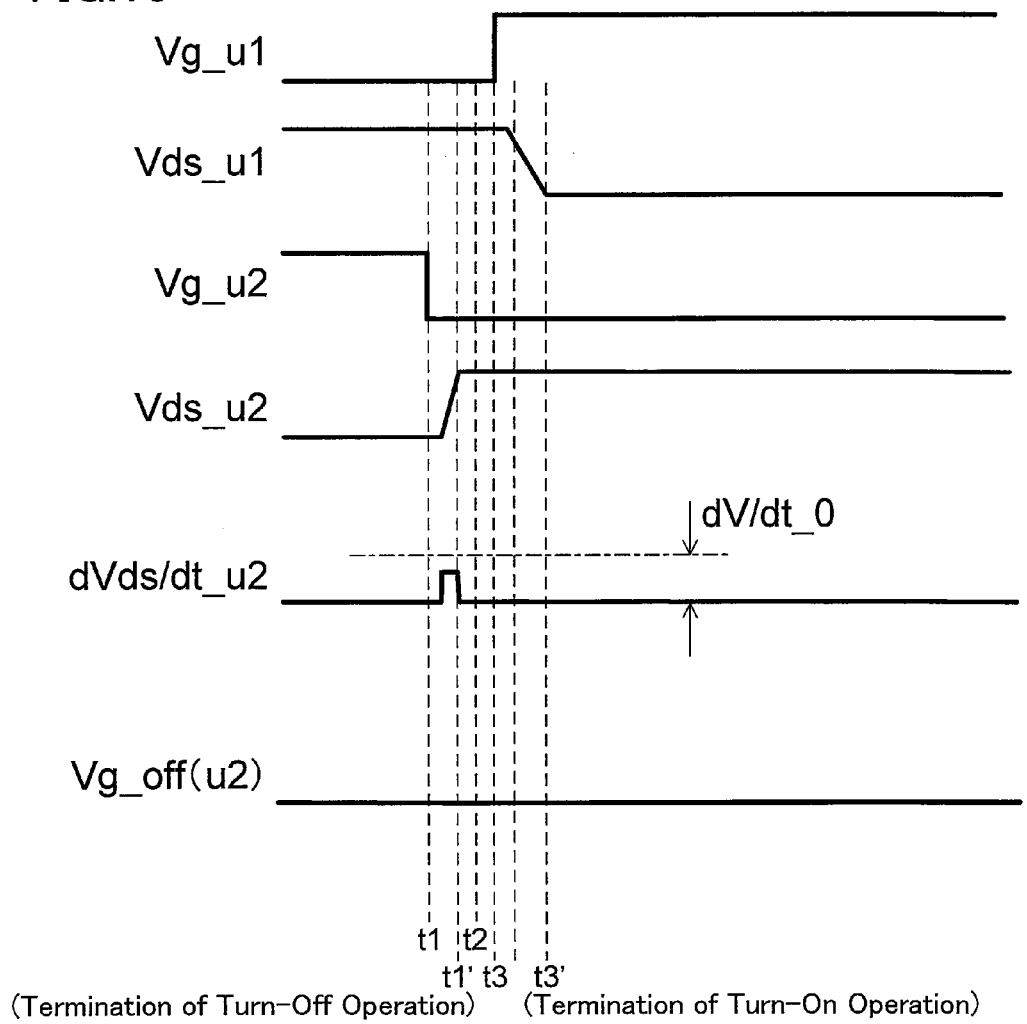
FIG. 13 is a timing chart of operation of an upper-arm gate drive circuit and a lower-arm gate drive circuit of a leg of an inverter of a power conversion circuit of a sixth embodiment of the present invention.

FIG. 13 is a timing chart illustrating the circuit operation of the upper-arm gate drive circuit 200u and the lower-arm gate drive circuit 300u. The signals in this chart are the same as those in FIG. 12, and thus description thereof is omitted here.

In this embodiment, when the output voltage value of the output signal dVds/dt_u2 of the lower-arm main terminal voltage change rate detection circuit 308u is smaller than a predetermined reference value dV/dt_0, the lower-arm first off-voltage adjustment circuit 309u stops outputting its output signal.

Therefore, a gate drive circuit with high reliability can be implemented, in which short-circuiting through the upper/lower arms due to high-frequency switching operation causing high dv/dt is avoided. Moreover, since the duration of application of a voltage lower than the gate voltage with which the arm is kept in its off state can be greatly shortened, the device life can be increased.

In addition, since the application of a voltage lower than a predetermined off voltage can be controlled when the change rate of the main terminal voltage is smaller than a reference value, the effect described above can be further increased.

(Seventh Embodiment)

A seventh embodiment of the present invention will be described with reference to FIG. 14.

Figure 14:
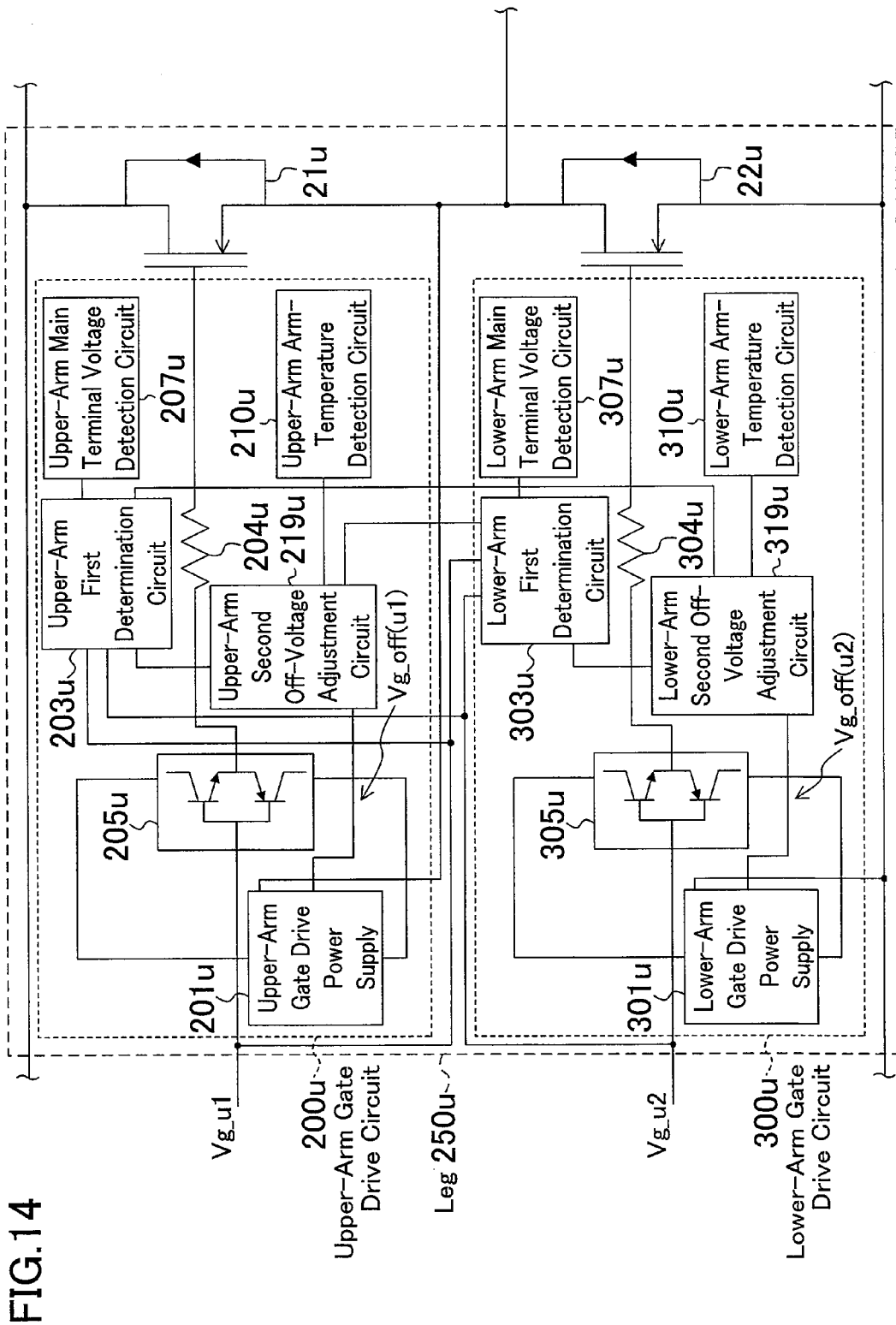
FIG. 14 is a circuit diagram showing the internal configuration of a leg of an inverter of a power conversion circuit of a seventh embodiment of the present invention.

FIG. 14 is a circuit diagram presented to illustrate the leg 250u in FIG. 5 in detail. The circuit diagram of FIG. 14 is different from that of FIG. 6 in that an upper-arm arm-temperature detection circuit 210u and a lower-arm arm-temperature detection circuit 310u are added, and that the upper-arm off-voltage control circuit 206u and the lower-arm off-voltage control circuit 306u are replaced with an upper-arm second off-voltage adjustment circuit 219u and a lower-arm second off-voltage adjustment circuit 319u. The other configuration is the same as that of FIG. 6, and thus description thereof is omitted here. Note that the "off-voltage control circuit" in the appended claims corresponds to the upper-arm second off-voltage adjustment circuit 219u and the lower-arm second off-voltage adjustment circuit 319u in the seventh embodiment.

The arm-temperature detection circuits 210u and 310u respectively detect the temperatures of the arms 21u and 22u, and output the detected values to the upper-arm second off-voltage adjustment circuit 219u and the lower-arm second off-voltage adjustment circuit 319u.

The upper-arm second off-voltage adjustment circuit 219u and the lower-arm second off-voltage adjustment circuit 319u respectively adjust the output voltages of the upper-arm gate drive power supply 201u and the lower-arm gate drive power supply 301u according to the detected temperatures of the upper arm 21u and the lower arm 22u.

The relationship between the temperature and the threshold voltage of a switching element that is to be an arm will be described.

Figure 15:
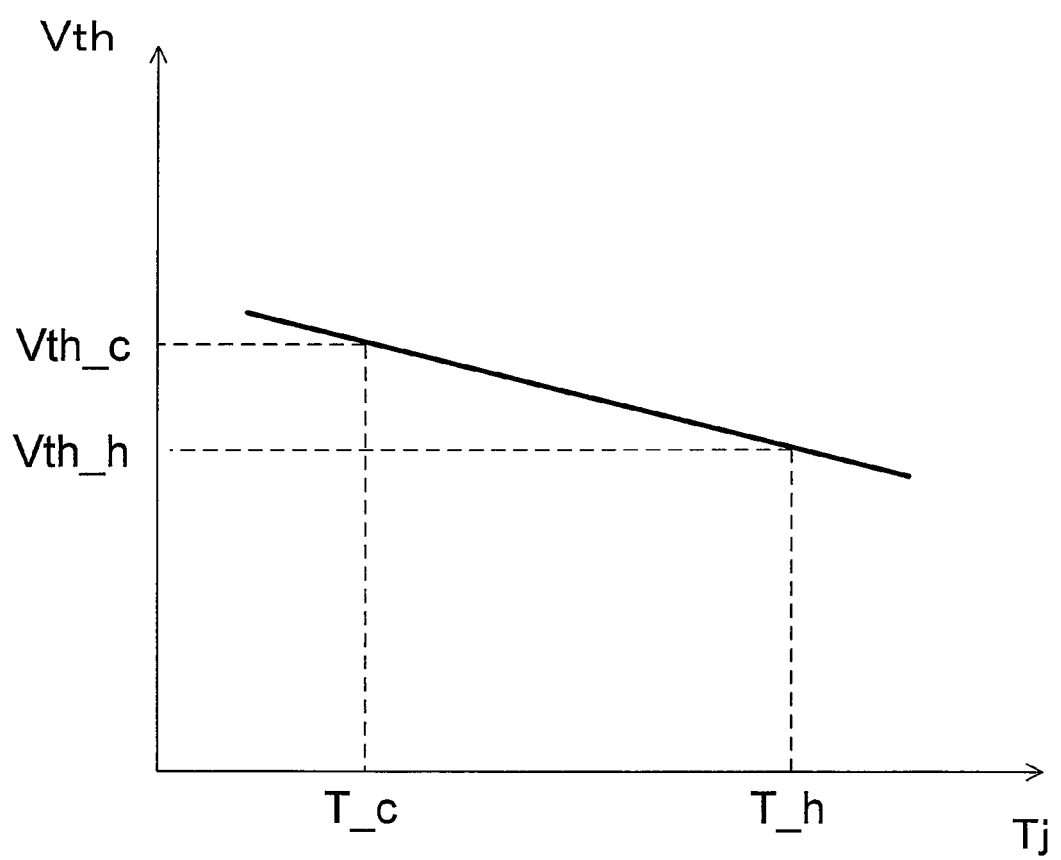
FIG. 15 is view showing the temperature of a general switching element as the x-axis with respect to the threshold voltage thereof as the y-axis.

FIG. 15 is a graph having the temperature of the switching element as the x-axis and the threshold voltage thereof as the y-axis. As is found from this graph, the threshold voltage gradually decreases with increase of the temperature of the switching element. This indicates that when the switching element is in a high-temperature state, it may possibly turn on with a comparatively low control terminal voltage.

The above problem can be solved by detecting the arm temperature and, according to the detected value, adjusting the output voltage of each of the upper-arm gate drive power supply 201u and the lower-arm gate drive power supply 301u to be lower than a value to which the threshold voltage value has decreased.

It is desirable to detect the junction temperature as the temperature of the switching element. However, any other temperature may be used as long as it is a temperature that is detected near the switching element and correlated with the threshold voltage.

The embodiments of the present invention were described above in a concrete manner. In the second to seventh embodiments, the arms are controlled so that a voltage lower than a predetermined off voltage is applied to the lower arm during turn-on operation of the upper arm, and also a voltage lower than a predetermined off voltage is applied to the upper arm during turn-on operation of the lower arm. Naturally, however, the present invention may be applied only to either of the arms.

In the second to seventh embodiments, the arms are controlled so that, during turn-on operation of one of the upper and lower arms, a voltage lower than a predetermined off voltage is applied to only the other arm. Alternatively, the arms may be controlled so that, during turn-on operation of the upper arm, for example, a voltage lower than a predetermined off voltage may be applied, not only to the lower arm belonging to the same leg as this upper arm, but also to all the other lower arms belonging to the other legs at the same timing. By controlling the arms in this way, in an inverter circuit, influence of switching operation at another phase can be avoided, permitting implementation of a gate drive circuit with high reliability. Moreover, since the duration of application of a voltage lower than the gate voltage with which the arm is kept in its off state can be greatly shortened, the device life can be increased.

In the case of controlling the arms so that a voltage lower than a predetermined off voltage is applied to all the lower arms belonging to the other legs, the off voltage may be adjusted for each of the lower arms. By this individual adjustment, when the lower arms of the legs are constructed of different types of devices, an optimum off voltage can be applied for each of the types of devices constituting the lower arms, permitting implementation of a gate drive circuit with high reliability. Moreover, since the duration of application of a voltage lower than the gate voltage with which the arm is kept in its off state can be greatly shortened, the life of the arm can be increased.

The voltage lower than a predetermined off voltage may be changed arbitrarily according to the voltage and current applied to the device. By controlling the arm in this way, influence of switching operation with a different voltage and current can be avoided, and thus malfunction can be avoided more reliably. Hence, a gate drive circuit with high reliability can be implemented.

All of the six upper/lower arms constituting the inverter are not necessarily constructed of the same switching element. The present invention may be applied to only a gate drive circuit for a switching element that performs high-speed switching and thus has a possibility of causing malfunction due to high dv/dt.

At least one of the upper and lower arms constituting the inverter may be a MOSFET. In general, a MOSFET performs high-speed switching and has a large parasitic capacitance, and thus is likely to cause malfunction due to high dv/dt. However, by applying the present invention to the gate drive circuit for driving such a MOSFET, a power conversion circuit with high reliability can be implemented.

At least one of the upper and lower arms constituting the inverter may be a wide bandgap semiconductor including silicon carbide or gallium nitride. A wide-gap semiconductor performs higher-speed switching and has a larger parasitic capacitance than general silicon semiconductors owing to its material and structure, and thus is likely to cause malfunction due to high dv/dt. However, by applying the present invention to the gate drive circuit for driving such a wide-gap semiconductor, a power conversion circuit with high reliability can be presented.

Also, in a wide-gap semiconductor, reliability of its control terminal is an important issue. By applying the present invention, the duration of application of an excessive voltage to the control terminal, which may affect the device life, can be widely shortened. Thus, since the device life can be increased, a power conversion device with high reliability can be presented.

Industrial Applicability

As described above, according to the present invention, a gate drive circuit with high reliability can be implemented, in which short-circuiting through upper and lower arms caused by high-speed switching (high dv/dt) of a power conversion circuit, such as an inverter and a converter, which operates with high frequency, is avoided. In addition, the duration of application of a voltage lower than the gate voltage with which the arm is kept in its off state can be greatly shortened, and thus the device life can be increased. Accordingly, the present invention is useful in all types of motor drive systems, including hybrid vehicles and electric vehicles, electric compressors, electric power steering, and elevators, for which size reduction is strongly requested, power generation systems, such as wind power generation systems, for which size reduction is also strongly desired, and the like.

DESCRIPTION OF REFERENCE CHARACTERS

1 Battery
2 Inverter
3 Motor
4 Control Circuit
21u-21w Upper Arm
22u-22w Lower Arm
23u-23w, 200u-200w Upper-Arm Gate Drive Circuit
24u-24w, 300u-300w Lower-Arm Gate Drive Circuit
25u-25w, 250u-250w Leg
100u Lower-Arm Timer Circuit (Signal Output Circuit)
101u, 306u Lower-Arm Off-Voltage Control Circuit
206u Upper-Arm Off-Voltage Control Circuit
102u, 305u Lower-Arm Arm-Drive Circuit
205u Upper-Arm Arm-Drive Circuit
103u, 301u Lower-Arm Gate Drive Power Supply
201u Upper-Ann Gate Drive Power Supply
104u, 105u, 304u Lower-Arm Gate Resistance
204u Upper-Arm Gate Resistance
200 Parasitic Capacitance
203u Upper-Arm First Determination Circuit
303u Lower-Arm First Determination Circuit
213u Upper-Arm Second Determination Circuit
313u Lower-Aim Second Determination Circuit
223u Upper-Arm Third Determination Circuit
323u Lower-Arm Third Determination Circuit
206u Upper-Arm Off-Voltage Control Circuit
306u Lower-Arm Off-Voltage Control Circuit
207u Upper-Arm Main Terminal Voltage Detection Circuit
307u Lower-Arm Main Terminal Voltage Detection Circuit
208u Upper-Arm Main Terminal Voltage Change Rate Detection Circuit
308u Lower-Arm Main Terminal Voltage Change Rate Detection Circuit
209u Upper-Arm First Off-Voltage Adjustment Circuit (Off-Voltage Control Circuit)
309u Lower-Arm First Off-Voltage Adjustment Circuit (Off-Voltage Control Circuit)
219u Upper-Arm Second Off-Voltage Adjustment Circuit (Off-Voltage Control Circuit)
319u Lower-Arm Second Off-Voltage Adjustment Circuit (Off-Voltage Control Circuit)
210u Upper-Arm Arm-Temperature Detection Circuit
310u Lower-Arm Ann-Temperature Detection Circuit
217u Upper-Arm Main Terminal Current Detection Circuit
317u Lower-Arm Main Terminal Current Detection Circuit
227u Upper-Arm Control Terminal Voltage Detection Circuit
327u Lower-Arm Control Terminal Voltage Detection Circuit

The invention claimed is:

1. A power conversion circuit, comprising:
an upper arm connected to a high-voltage side;
a lower arm connected to a low-voltage side;
an upper-arm gate drive circuit configured to drive the upper arm, and
a lower-arm gate drive circuit configured to drive the lower arm, wherein
the upper-arm gate drive circuit includes an upper-arm gate drive power supply and an upper-arm arm-drive circuit, and the lower-arm gate drive circuit includes a lower-arm gate drive power supply and a lower-arm arm-drive circuit,
the upper-arm gate drive power supply and the lower-arm gate drive power supply supply a voltage to a control terminal of the corresponding upper or lower arm,
the upper-arm arm-drive circuit and the lower-arm arm-drive circuit, receiving a control signal for controlling the corresponding upper or lower arm, output an arm drive signal according to the control signal,
the lower-arm gate drive circuit further includes a signal output circuit and an off-voltage control circuit,
the signal output circuit outputs a voltage adjustment signal responding to termination of turn-off operation of the lower arm and termination of turn-on operation of the upper arm,
the off-voltage control circuit controls the output voltage of the lower-arm gate drive power supply, in response to the voltage adjustment signal from the signal output circuit, to generate a second voltage lower than a first voltage satisfying an off state of the lower arm during a time period from termination of turn-off operation of the lower arm until start of turn-on operation of the upper arm, and to generate the first voltage instead of the second voltage at and after termination of the turn-on operation of the upper arm.

2. The power conversion circuit of claim 1, wherein
the signal output circuit includes a timer circuit,
the timer circuit, receiving the control signals for the upper arm and the lower arm, outputs a timer signal that turns on in a time period when the control signals are both off and thus the lower arm and the upper arm are both in their off states, and turns off after a lapse of a predetermined time from the turn-on, which is at or after termination of turn-on operation of the upper arm, and
the off-voltage control circuit, receiving the timer signal from the timer circuit, controls the output voltage of the lower-arm gate drive power supply based on the timer signal.

3. The power conversion circuit of claim 1, wherein
the signal output circuit includes an upper-arm main terminal voltage detection circuit, a lower-arm main terminal voltage detection circuit, an upper-arm determination circuit, and a lower-arm determination circuit,
the upper-arm main terminal voltage detection circuit and the lower-arm main terminal voltage detection circuit detect a main terminal voltage value of the corresponding upper or lower arm, and
the upper-arm determination circuit and the lower-arm determination circuit, receiving the main terminal voltage signal detected by the corresponding upper-arm or lower-arm main terminal voltage detection circuit, detect termination of turn-off operation and turn-on operation of the corresponding upper or lower arm based on the main terminal voltage signal.

4. The power conversion circuit of claim 3, wherein
the upper-arm determination circuit and the lower-arm determination circuit, receiving the main terminal voltage signal detected by the corresponding upper-arm or lower-arm main terminal voltage detection circuit, determine termination of turn-on operation and turn-off operation of the corresponding arm based on comparison of the voltage value of the main terminal voltage signal with a predetermined reference voltage.

5. The power conversion circuit of claim 1, wherein
the signal output circuit includes an upper-arm main terminal current detection circuit, a lower-arm main terminal current detection circuit, an upper-arm determination circuit, and a lower-arm determination circuit,
the upper-arm main terminal current detection circuit and the lower-arm main terminal current detection circuit detect a main terminal current value of the corresponding upper or lower arm, and
the upper-arm determination circuit and the lower-arm determination circuit detect termination of turn-off operation and turn-on operation of the corresponding upper or lower arm based on the main terminal current signal detected by the corresponding upper-arm or lower-arm main terminal current detection circuit.

6. The power conversion circuit of claim 5, wherein
the upper-arm determination circuit and the lower-arm determination circuit, receiving the main terminal current signal from the corresponding upper-arm or lower-arm main terminal current detection circuit, determine termination of turn-on operation and turn-off operation of the corresponding arm based on comparison of the current value of the main terminal current signal with a predetermined reference current.

7. The power conversion circuit of claim 1, wherein
the signal output circuit includes an upper-arm control terminal voltage detection circuit, a lower-arm control terminal voltage detection circuit, an upper-arm determination circuit, and a lower-arm determination circuit,
the upper-arm control terminal voltage detection circuit and the lower-arm control terminal voltage detection circuit detect a control terminal voltage value of the corresponding upper or lower arm, and
the upper-arm determination circuit and the lower-arm determination circuit detect termination of turn-off operation and turn-on operation of the corresponding upper or lower arm based on the control terminal voltage signal detected by the corresponding upper-arm or lower-arm control terminal voltage detection circuit.

8. The power conversion circuit of claim 7, wherein
the upper-arm determination circuit and the lower-arm determination circuit, receiving the control terminal voltage signal detected by the control terminal voltage detection circuit of the corresponding arm, determine termination of turn-on operation and turn-off operation of the corresponding arm based on comparison of the voltage of the control terminal voltage signal with a predetermined reference voltage.

9. The power conversion circuit of claim 3, wherein
the signal output circuit further includes a lower-arm main terminal voltage change rate detection circuit,
the lower-arm main terminal voltage change rate detection circuit detects a change rate of the main terminal voltage of the corresponding lower arm, and
the off-voltage control circuit, receiving the detection result of the lower-arm main terminal voltage change rate detection circuit, changes the voltage value of the second voltage generated by the lower-arm gate drive power supply based on the detection result.

10. The power conversion circuit of claim 9, wherein
the off-voltage control circuit adjusts the voltage value of the second voltage generated by the lower-arm gate drive power supply to be lower as the change rate of the main terminal voltage of the lower arm is larger.

11. The power conversion circuit of claim 9, wherein
the off-voltage control circuit keeps the voltage value of the second voltage generated by the lower-arm gate drive power supply at the first voltage when the change rate of the main terminal voltage of the lower arm is smaller than a predetermined change rate.

12. The power conversion circuit of claim 3, wherein
the signal output circuit further includes a lower-arm arm-temperature detection circuit,
the lower-arm arm-temperature detection circuit detects the temperature of the corresponding lower arm, and
the off-voltage control circuit, receiving the detection result of the lower-arm arm-temperature detection circuit, changes the voltage value of the second voltage generated by the lower-arm gate drive power supply based on the detection result.

13. The power conversion circuit of claim 12, wherein
the off-voltage control circuit adjusts the voltage value of the second voltage generated by the lower-arm gate drive power supply to be lower as the temperature of the lower arm detected by the lower-arm arm-temperature detection circuit is higher.

14. A power conversion circuit, comprising:
an upper arm connected to a high-voltage side;
a lower arm connected to a low-voltage side;
an upper-arm gate drive circuit configured to drive the upper arm, and
a lower-arm gate drive circuit configured to drive the lower arm, wherein
the upper-arm gate drive circuit includes an upper-arm gate drive power supply and an upper-arm arm-drive circuit, and the lower-arm gate drive circuit includes a lower-arm gate drive power supply and a lower-arm arm-drive circuit,
the upper-arm gate drive power supply and the lower-arm gate drive power supply supply a voltage to a control terminal of the corresponding upper or lower arm,
the upper-arm arm-drive circuit and the lower-arm arm-drive circuit, receiving a control signal for controlling the corresponding upper or lower arm, output an arm drive signal according to the control signal,
the upper-arm gate drive circuit further includes a signal output circuit and an off-voltage control circuit, the signal output circuit outputs a voltage adjustment signal corresponding to termination of turn-off operation of the upper arm and termination of turn-on operation of the lower arm, the off-voltage control circuit controls the output voltage of the upper-arm gate drive power supply, in response to the voltage adjustment signal from the signal output circuit, to generate a second voltage lower than a first voltage satisfying an off state of the upper arm during a time period from termination of turn-off operation of the upper arm until start of turn-on operation of the lower arm, and to generate the first voltage instead of the second voltage at and after termination of the turn-on operation of the lower arm.

15. The power conversion circuit of claim 14, wherein the signal output circuit includes a timer circuit, the timer circuit, receiving the control signals for the upper arm and the lower arm, outputs a timer signal that turns on in a time period when the control signals are both off and thus the lower arm and the upper arm are both in their off states, and turns off after a lapse of a predetermined time of the turn-on, which is at or after termination of turn-on operation of the lower arm, and the off-voltage control circuit, receiving the timer signal from the timer circuit, controls the output voltage of the lower-arm gate drive power supply based on the timer signal.

16. The power conversion circuit of claim 14, wherein the signal output circuit includes an upper-arm main terminal voltage detection circuit, a lower-arm main terminal voltage detection circuit, an upper-arm determination circuit, and a lower-arm determination circuit, the upper-arm main terminal voltage detection circuit and the lower-arm main terminal voltage detection circuit detect a main terminal voltage value of the corresponding upper or lower arm, and the upper-arm determination circuit and the lower-arm determination circuit, receiving the main terminal voltage signal detected by the corresponding upper-arm or lower-arm main terminal voltage detection circuit, detect termination of turn-off operation and turn-on operation of the corresponding upper or lower arm based on the main terminal voltage signal.

17. The power conversion circuit of claim 16, wherein the upper-arm determination circuit and the lower-arm determination circuit, receiving the main terminal voltage signal detected by the corresponding upper-arm or lower-arm main terminal voltage detection circuit, determine termination of turn-on operation and turn-off operation of the corresponding arm based on comparison of the voltage value of the main terminal voltage signal with a predetermined reference voltage.

18. The power conversion circuit of claim 14, wherein the signal output circuit includes an upper-arm main terminal current detection circuit, a lower-arm main terminal current detection circuit, an upper-arm determination circuit, and a lower-arm determination circuit, the upper-arm main terminal current detection circuit and the lower-arm main terminal current detection circuit detect a main terminal current value of the corresponding upper or lower arm, and the upper-arm determination circuit and the lower-arm determination circuit detect termination of turn-off operation and turn-on operation of the corresponding upper or lower arm based on the main terminal current signal detected by the corresponding upper-arm or lower-arm main terminal current detection circuit.

19. The power conversion circuit of claim 18, wherein the upper-arm determination circuit and the lower-arm determination circuit, receiving the main terminal current signal from the corresponding upper-arm or lower-arm main terminal current detection circuit, determine termination of turn-on operation and turn-off operation of the corresponding arm based on comparison of the current value of the main terminal current signal with a predetermined reference current.

20. The power conversion circuit of claim 14, wherein the signal output circuit includes an upper-arm control terminal voltage detection circuit, a lower-arm control terminal voltage detection circuit, an upper-arm determination circuit, and a lower-arm determination circuit, the upper-arm control terminal voltage detection circuit and the lower-arm control terminal voltage detection circuit detect a control terminal voltage value of the corresponding upper or lower arm, and the upper-arm determination circuit and the lower-arm determination circuit detect termination of turn-off operation and turn-on operation of the corresponding upper or lower arm based on the control terminal voltage signal detected by the corresponding upper-arm or lower-arm control terminal voltage detection circuit.

21. The power conversion circuit of claim 20, wherein the upper-arm determination circuit and the lower-arm determination circuit, receiving the control terminal voltage signal detected by the control terminal voltage detection circuit of the corresponding arm, determine termination of turn-on operation and turn-off operation of the corresponding arm based on comparison of the voltage of the control terminal voltage signal with a predetermined reference voltage.

22. The power conversion circuit of claim 16, wherein the signal output circuit further includes an upper-arm main terminal voltage change rate detection circuit, the upper-arm main terminal voltage change rate detection circuit detects a change rate of the main terminal voltage of the corresponding upper arm, and the off-voltage control circuit, receiving the detection result of the upper-arm main terminal voltage change rate detection circuit, changes the voltage value of the second voltage generated by the upper-arm gate drive power supply based on the detection result.

23. The power conversion circuit of claim 22, wherein the off-voltage control circuit adjusts the voltage value of the second voltage generated by the upper-arm gate drive power supply to be lower as the change rate of the main terminal voltage of the upper arm is larger.

24. The power conversion circuit of claim 22, wherein the off-voltage control circuit keeps the voltage value of the second voltage generated by the upper-arm gate drive power supply at the first voltage when the change rate of the main terminal voltage of the upper arm is smaller than a predetermined change rate.

25. The power conversion circuit of claim 16, wherein the signal output circuit further includes an upper-arm arm-temperature detection circuit, the upper-arm arm-temperature detection circuit detects the temperature of the corresponding upper arm, and the off-voltage control circuit, receiving the detection result of the upper-arm arm-temperature detection circuit, changes the voltage value of the second voltage generated by the upper-arm gate drive power supply based on the detection result.

26. The power conversion circuit of claim 25, wherein
the off-voltage control circuit adjusts the second voltage generated by the upper-arm gate drive power supply to be lower as the temperature of the upper arm detected by the upper-arm arm-temperature detection circuit is higher.

27. The power conversion circuit of claim 1, wherein each of the upper arm and the lower arm is constructed of a MOSFET.

28. The power conversion circuit of claim 1,
wherein each of the upper arm and the lower arm is constructed of a wide bandgap semiconductor including silicon carbide or gallium nitride.

29. The power conversion circuit of 14, wherein
each of the upper arm and the lower arm is constructed of a MOSFET.

30. The power conversion circuit of 14, wherein
each of the upper arm and the lower arm is constructed of a wide bandgap semiconductor including silicon carbide or gallium nitride.

* * * * *